(12) United States Patent
Amaru

(10) Patent No.: US 10,402,143 B2
(45) Date of Patent: Sep. 3, 2019

(54) IMAGE PROJECTION MEDIUM AND DISPLAY PROJECTION SYSTEM USING SAME

(71) Applicant: SenseDriver Technologies, LLC, Malden, MA (US)

(72) Inventor: Michael Amaru, Reading, MA (US)

(73) Assignee: SenseDriver Technologies, LLC, Malden, MA (US)

( * ) Notice: Subject to any disclaimer, the term of this patent is extended or adjusted under 35 U.S.C. 154(b) by 0 days.

(21) Appl. No.: 15/546,417

(22) PCT Filed: Jan. 27, 2016

(86) PCT No.: PCT/US2016/015187
§ 371 (c)(1),
(2) Date: Jul. 26, 2017

(87) PCT Pub. No.: WO2016/123248
PCT Pub. Date: Aug. 4, 2016

(65) Prior Publication Data
US 2018/0004473 A1    Jan. 4, 2018

Related U.S. Application Data

(60) Provisional application No. 62/108,517, filed on Jan. 27, 2015.

(51) Int. Cl.
*G09G 5/00* (2006.01)
*G06F 3/14* (2006.01)
(Continued)

(52) U.S. Cl.
CPC ............ *G06F 3/1423* (2013.01); *B60K 35/00* (2013.01); *B60K 37/00* (2013.01);
(Continued)

(58) Field of Classification Search
CPC ........ G06F 3/0354; G06F 3/14; G06F 3/1423; G06F 2203/0384; G06F 3/03547;
(Continued)

(56) References Cited

U.S. PATENT DOCUMENTS 3,936,605 A    2/1976    Upton
4,740,780 A    4/1988    Brown et al.
(Continued)

FOREIGN PATENT DOCUMENTS

CN    202986989    3/2013
CN    202986989    6/2013
(Continued)

OTHER PUBLICATIONS

European Office Action dated Feb. 22, 2018 issued in corresponding European Application No. 14831305.9.
(Continued)

*Primary Examiner* — Joe H Cheng
(74) *Attorney, Agent, or Firm* — Onello & Mello, LLP

(57) ABSTRACT

A heads up display system includes a display medium in combination with a dock or support configured to receiving a portable electronic device. The display of the portable electronic device is projected by the display medium, such as in a forward direction. The vehicle dashboard or a surrounding area can have an integral dock, which can be at a top of a gauge visor, bottom of a gauge visor, is displace below vehicle gauges. In each case, an aperture may be provide to provide a path from the display of the electronic device to the display medium. In some embodiments, the heads up display system may include a dedicated display that mirrors the display of the portable electronic device, via a wired or wireless connection.

20 Claims, 30 Drawing Sheets

(51) Int. Cl.
*G02B 27/30* (2006.01)
*B60K 37/00* (2006.01)
*B60R 11/02* (2006.01)
*B60K 35/00* (2006.01)
*G02B 27/01* (2006.01)
*G02F 1/19* (2019.01)
*B60R 11/00* (2006.01)
*G06F 3/16* (2006.01)

(52) U.S. Cl.
CPC ...... *B60R 11/0229* (2013.01); *B60R 11/0241* (2013.01); *B60R 11/0264* (2013.01); *G02B 27/0101* (2013.01); *G02B 27/30* (2013.01); *G02F 1/19* (2013.01); *B60K 2350/1024* (2013.01); *B60K 2350/1072* (2013.01); *B60K 2350/2052* (2013.01); *B60K 2350/2065* (2013.01); *B60K 2350/355* (2013.01); *B60K 2350/921* (2013.01); *B60K 2350/94* (2013.01); *B60R 2011/001* (2013.01); *B60R 2011/0026* (2013.01); *B60R 2011/0056* (2013.01); *B60R 2011/0075* (2013.01); *G02B 2027/014* (2013.01); *G02B 2027/0141* (2013.01); *G06F 3/167* (2013.01)

(58) Field of Classification Search
CPC ........ G02B 27/01; G02B 27/01; G02B 27/30; G02B 27/0101; G01C 21/365; B60K 35/00; B60K 37/00; B60R 11/02; B60R 11/0229; B60R 11/0258; B60R 11/0264; B60R 2011/0005; H04M 1/6075; H04M 1/6091
See application file for complete search history.

(56) References Cited

U.S. PATENT DOCUMENTS

| | | | |
|---|---|---|---|
| 5,013,135 A | 5/1991 | Yamamura | |
| 5,214,413 A | 5/1993 | Okabayashi et al. | |
| 5,325,975 A | 7/1994 | Brown et al. | |
| 5,394,203 A | 2/1995 | Murphy et al. | |
| 5,555,502 A | 9/1996 | Opel | |
| 5,677,701 A | 10/1997 | Okuyama et al. | |
| 5,878,395 A | 3/1999 | Bennett | |
| 5,905,477 A | 5/1999 | Kuwayama et al. | |
| 6,078,428 A | 6/2000 | Rambert et al. | |
| 6,209,767 B1 | 4/2001 | Liou | |
| 6,529,381 B1 | 3/2003 | Schoenfish | |
| 6,789,901 B1 | 9/2004 | Kormos | |
| 6,832,151 B2 | 12/2004 | Kumazaki et al. | |
| 7,111,996 B2 | 9/2006 | Seger et al. | |
| 7,126,583 B1 | 10/2006 | Breed | |
| 7,353,110 B2 | 4/2008 | Kim | |
| 7,565,180 B2 | 7/2009 | Tsai | |
| 7,623,294 B2 | 11/2009 | Harada et al. | |
| 7,734,414 B2 | 6/2010 | Gershony et al. | |
| 8,249,798 B2 | 8/2012 | Hawes et al. | |
| 8,301,108 B2 | 10/2012 | Naboulsi | |
| 8,503,762 B2 | 8/2013 | Ben Tzvi | |
| 8,698,858 B2 | 4/2014 | Kurozuka et al. | |
| 8,781,670 B2 | 7/2014 | Dolgov et al. | |
| 8,786,697 B2 | 7/2014 | Kawasaki | |
| 8,947,263 B2 | 2/2015 | Garay et al. | |
| 8,952,819 B2 | 2/2015 | Nemat-Nasser | |
| 9,205,816 B2 | 12/2015 | Kobana et al. | |
| 9,268,135 B2 | 2/2016 | Jan et al. | |
| 9,274,336 B2 | 3/2016 | Deubzer et al. | |
| 9,324,234 B2 * | 4/2016 | Ricci ........................ | H04W 4/90 |
| 9,395,544 B2 | 7/2016 | Luttmann et al. | |
| 9,596,096 B2 | 3/2017 | Taylor | |
| 9,884,591 B2 | 2/2018 | Hoek et al. | |
| 9,918,001 B2 | 3/2018 | Pisz | |
| 9,918,681 B2 | 3/2018 | Wallace et al. | |
| 2002/0068605 A1 | 6/2002 | Stanley | |
| 2003/0043029 A1 | 3/2003 | Ichikawa et al. | |
| 2004/0160124 A1 | 8/2004 | Arai | |
| 2004/0164971 A1 | 8/2004 | Hayward et al. | |
| 2004/0204004 A1 | 10/2004 | Chen | |
| 2004/0209594 A1 * | 10/2004 | Naboulsi ............ | B60R 11/0264 455/404.1 |
| 2006/0012884 A1 | 1/2006 | Snorteland et al. | |
| 2006/0077497 A1 | 4/2006 | Harada et al. | |
| 2006/0261931 A1 | 11/2006 | Cheng | |
| 2007/0082713 A1 * | 4/2007 | Tsai .................... | H04M 1/6075 455/569.2 |
| 2007/0217018 A1 | 9/2007 | Fredriksson | |
| 2007/0233376 A1 | 10/2007 | Gershony et al. | |
| 2008/0001727 A1 | 1/2008 | Ohsumi et al. | |
| 2009/0150061 A1 | 6/2009 | Chen et al. | |
| 2010/0268426 A1 | 10/2010 | Pathak et al. | |
| 2010/0320341 A1 | 12/2010 | Baumann et al. | |
| 2011/0001932 A1 | 1/2011 | Zuehlsdorff | |
| 2011/0093190 A1 | 4/2011 | Yoon | |
| 2012/0242724 A1 | 9/2012 | Kurozuka et al. | |
| 2013/0018549 A1 | 1/2013 | Kobana et al. | |
| 2013/0072787 A1 | 3/2013 | Wallace et al. | |
| 2013/0108229 A1 * | 5/2013 | Starner .................. | G02B 27/01 385/119 |
| 2013/0167159 A1 | 6/2013 | Ricci et al. | |
| 2014/0095294 A1 | 4/2014 | Vick et al. | |
| 2014/0121927 A1 | 5/2014 | Hanita | |
| 2014/0210625 A1 | 7/2014 | Nemat-Nasser | |
| 2014/0232564 A1 | 8/2014 | Garay et al. | |
| 2014/0267066 A1 | 9/2014 | Kolehmainen | |
| 2014/0313586 A1 | 10/2014 | Jan et al. | |
| 2014/0320973 A1 | 10/2014 | Deubzer et al. | |
| 2015/0054760 A1 | 2/2015 | Amaru et al. | |
| 2015/0062342 A1 | 3/2015 | Hoek et al. | |
| 2015/0260992 A1 | 9/2015 | Luttmann et al. | |
| 2015/0363348 A1 * | 12/2015 | Deratany ............ | G06F 13/4081 710/304 |
| 2016/0057335 A1 | 2/2016 | Pisz | |
| 2016/0080163 A1 | 3/2016 | Taylor | |
| 2016/0086305 A1 | 3/2016 | Watanabe | |
| 2016/0341962 A1 | 11/2016 | Amaru et al. | |
| 2017/0174129 A1 | 6/2017 | Chin et al. | |
| 2017/0239014 A1 | 8/2017 | Chin et al. | |
| 2017/0305349 A1 * | 10/2017 | Naboulsi ................... | B60R 1/04 |
| 2017/0343805 A1 | 11/2017 | Amaru et al. | |
| 2018/0004473 A1 | 1/2018 | Amaru | |

FOREIGN PATENT DOCUMENTS

| | | |
|---|---|---|
| DE | 102011120948 | 5/2013 |
| FR | 2943431 | 9/2010 |
| KR | 20130036934 | 4/2013 |
| WO | 2015017693 | 2/2015 |
| WO | 2015095849 | 6/2015 |
| WO | 2015134840 | 9/2015 |
| WO | 2016123248 | 8/2016 |

OTHER PUBLICATIONS

Chinese Office Action dated May 8, 2018 issued in corresponding Chinese Application No. 201480054192.2, with English language summary.
Extended European Search Report dated Jan. 19, 2018 issued in corresponding European Application No. 14872906.4.
International Search Report and Written Opinion dated Apr. 13, 2016 issued in corresponding International Application No. PCT/US16/15187.
International Search Report and Written Opinion dated Jun. 19, 2015 in corresponding PCT Application No. PCT/US2015/019113.
Colaner, Seth, "$99 SenseHUD Merely Beginning of SenseDriver's Push for Auto Display Platform Dominance". Dec. 31, 2014. Retrieved from the Internet: http://www.tomshardware.com/news/sensedriver-sensehud-99-copilot,28289.html.
EESR dated Mar. 6, 2017 issued in corresponding European Application No. 14831305.9.

(56) References Cited

OTHER PUBLICATIONS

ISRWO dated Apr. 7, 2015 in corresponding International Application No. PCT/US2014/71759.
Partial European Search Report dated Aug. 14, 2017 issued in corresponding European Application No. 14872906.4.
Search Report and Written Opinion dated Dec. 11, 2014 in related PCT application No. PCT/US2014/049225.
Cunningham, Wayne, "SenseHUD, The Smartphone-Powered Windshield Display". Jan. 6, 2015. Retrieved from the Internet: https://www.cnet.com/roadshow/auto/sensedriver-technologies-sensehud/preview/.
Eley, B. Magnetstick-Onperiscope Lense for Iphoneand Camera Phones Surfaces May 7, 2013, Retrieved from the internet : <URL: http://geardiary.com/2013/05/07/magnet-stick-on-periscope-lense-for-iphone-and-camera-phones-surfaces/>; paragraph 3; figure 2.
Kee, Edwin, "SenseHUD, Is the Ultimate Portable Head-Up Display". Jan. 7, 2015. Retrieved from the Internet: http://www.ubergizmo.com/2015/01/sensehud-is-the-ultimate-portable-head-up-display/.
Marks, Lester Victor, "SenseHUD Turns your Iphone into a portable heads-up display". Jan. 7, 2015. Retrieved from the Internet: http://appleinsider.com/articles/15/01/07/first-look-sensehud-turns-your-iphone-into-a-portable-heads . . . .
Stroub, S, "Gearing Up to Battle Snow" 2, Heads Up! Feb. 12, 2014. Retrieved from the Internet: <URL: https://seancrosspoints.wordpress.com/2014/02/12/GEARING-UP-TO-BATTLE-SNOW-2-HEADS-UP/>; paragraph 7.

\* cited by examiner

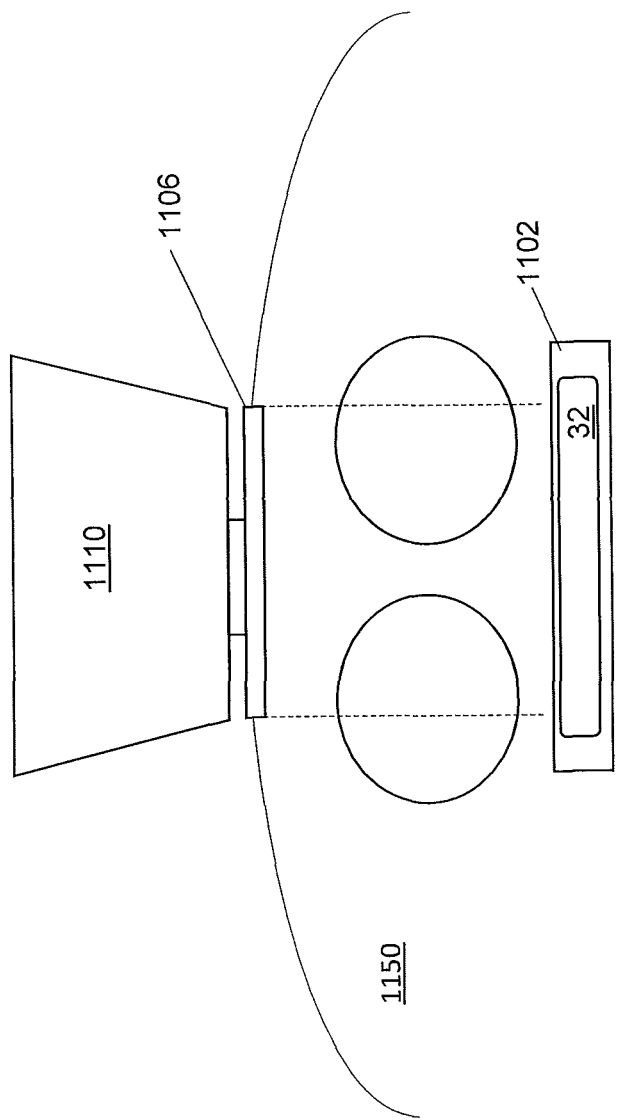

IMAGE PROJECTION MEDIUM AND DISPLAY PROJECTION SYSTEM USING SAME

REFERENCE TO RELATED APPLICATIONS

The present invention claims priority under 35 U.S.C. 119(e) to U.S. provisional patent application 62/108,517 entitled AN IMAGE PROJECTION MEDIUM AND DISPLAY PROJECTION SYSTEM USING SAME, filed Jan. 27, 2015, which is incorporated herein by reference in its entirety.

FIELD OF INTEREST

Inventive concepts relate to the field of portable electronic devices, and more particularly, to the field of cellular and network display devices and reflective mediums useful therein.

BACKGROUND

Mobile devices having a display, also known as portable electronic devices, such as tablets and cellular telephones have become ubiquitous, and, with the advent and growing popularity of smartphones, not only are they a dominant force in voice communications, they increasingly play a role in data communications. The term "smartphone" is generally employed to refer to a cellular telephone that provides features beyond simply voice communications, such as geographical mapping and navigation (using, for example, global positioning system (GPS) links), access to musical libraries, Internet access, and non-voice messaging, such as texting, for example. Such features may be provided by applications, often referred to as "apps." Smartphones may operate using any of a variety of platforms, using any of a variety of operating systems, available from Internet providers and a number of cell-phone manufacturers and cellular service providers.

Although such applications are convenient and popular, many automobile accidents are now attributed to a driver's use of a cell phone or smartphone while driving. As a result a number of states ban drivers from text messaging while driving and some states even ban the use of a cell phone while driving. Many countries ban all cell phone use while driving. These measures have been undertaken, in part, because a driver's use of a cell phone or smartphone can distract the driver from the primary responsibility of safe driving. Three types of distraction attributable to cell phone usage while driving are now widely recognized. Visual distraction occurs when the driver takes his or her eyes off the road to view his cell phone. Manual/mechanical distraction occurs when the driver removes one or both hands from the steering wheel to operate his cell phone. Either of these distractions or other can lead to a cognitive distraction whereby a driver's reaction time may be impaired.

Although systems and methods have been developed or proposed to minimize distractions during cell phone usage, problems remain and, as a result, a need exists for a system that provides information to a driver through a heads-up display and input through a device conveniently mounted on a steering wheel or through voice recognition, for example, so that visual, mechanical and cognitive driving distractions are minimized.

SUMMARY

In accordance aspects of the inventive concept, provided is a heads-up-display (HUD) system, comprising: a display medium; a collimator aligned with the display medium; a dock configured to accept a portable electronic device having a display and to align the portable electronic device display with the display medium and collimator; and a set of control and communications electronics configured to control the display medium and communicate with the portable electronic device, wherein the display medium and collimator are configured to cooperatively project an output of portable electronic device display to a location off of the display medium to form a projected display.

In various embodiments, the display medium is a partially reflective mirror that comprises an electrically switchable mirror.

In various embodiments, HUD system can further comprise an input device that includes a wireless interface for communication with a controller of controlling the electrically switchable transreflective mirror.

In various embodiments, the projected display is configured to display navigational information.

In various embodiments, the projected display is configured to display musical selection information.

In various embodiments, the projected display is configured to display vehicle parameters.

In various embodiments, the projected display is configured to display vehicle parameters including vehicle speed.

In various embodiments, the projected display is configured to be responsive to voice commands In various embodiments, the voice commands include a triggering command configured to initiate communication between the portable electronic device and the HUD system.

In various embodiments, the HUD system is responsive to a set of predetermined voice commands.

In various embodiments, the predetermined voice commands include predetermined vehicle information and/or control commands In various embodiments, the predetermined voice commands include natural language commands.

In various embodiments, the system is configured to control the switchable mirror to be highly reflective when the vehicle is not traveling.

In various embodiments, the system is configured to provide web browsing when the vehicle is not traveling.

In various embodiments, the system is configured to collect and store data.

In various embodiments, the system is configured to store and/or display data including, vehicle speed, vehicle location, and music information.

In various embodiments, the system is configured to upload data to remote storage.

In various embodiments, the dock is integral with gauge visor of a vehicle dashboard.

In various embodiments, the dock is integral with a top portion or surface of a gauge visor of a vehicle dashboard.

In various embodiments, the dock is integral with a bottom portion or surface of a gauge visor of a vehicle dashboard.

In various embodiments, the dock is integral with an intermediate portion or surface of a gauge visor of a vehicle dashboard.

In various embodiments, the dock is located below a vehicle gauge area of a vehicle dashboard.

In various embodiments, the dock is located on a steering column and below a vehicle gauge area of a vehicle dashboard.

In various embodiments, the dashboard includes an aperture between the dock and the display medium that enables transmission of the portable electronic device to the display medium.

In various embodiments, the HUD system can further comprise a display frame that at least partially covers edges of the display medium. In various embodiments, the display frame can add rigidity to display medium. In various embodiments, the display frame can prevent warping, distortion, and/or damage to the display medium.

In accordance with another aspect of the inventive concept, provided is a heads-up-display (HUD) system, comprising: a display medium; a collimator aligned with the display medium; a dedicated display aligned with the display medium and collimator; a communication device configured to communicate with a portable electronic device; and a set of control and communications electronics configured to control the display medium, the dedicated display, and communicate with the portable electronic device to receive at least display information from the portable electronic device. The display medium and collimator are configured to cooperatively project an output of the dedicated display that is received from the portable electronic device display to a location off of the display medium to form a projected display.

In various embodiments, the communication between the portable electronic device and the set of control and the HUD system includes wireless communications.

In various embodiments, the communication between the portable electronic device and the set of control and the HUD system includes wired communications.

In accordance with another aspect of the inventive concept, provided is a HUD system as shown and described.

In accordance with another aspect of the inventive concept, provided is a method of providing a projected display of a portable electronic device as shown and described.

In accordance with another aspect of the inventive concept, provided is a vehicle comprising a HUD system as shown and described.

In accordance with another aspect of the inventive concept, provided is a display medium as shown and described.

In accordance with another aspect of the inventive concept, provided is a display medium as shown and described, comprising 4 or more layers of glass.

In accordance with another aspect of the inventive concept, provided is a HUD system configured for portable electronic device display minoring and/or linking In exemplary embodiments in accordance with principles of inventive concepts, a vehicular heads-up-display system may include a dashboard- or windshield-mountable partially reflective minor that is configured to reflect to a vehicle operator the contents of the display of a portable electronic device, such as a smartphone. A mount may be configured to accept a portable electronic device and to project the display of the portable electronic device to the partially reflective minor when mounted in a vehicle. The dashboard of a vehicle may be configured to accept a portable electronic device and the partially reflective minor to project the display of the portable electronic device through an aperture in the dashboard onto the partially reflective minor. In exemplary embodiments, the portable device may be held on the undersurface of the dashboard and the minor located on the upper/opposite surface of the dashboard proximal to the aperture. In exemplary embodiments the gauge visor portion of the dashboard incorporates the mobile device, aperture and minor. In such embodiments, the mobile device may be held at the undersurface of the dashboard by spring-loaded, self-centering, universal, paddles to position the device directly below the aperture and the minor. A tactile input device that includes a wireless interface for entry and transmission of input from a vehicle user to a portable electronic device such as a smartphone mounted in the mount may be configured for mounting on a vehicle steering wheel.

In exemplary embodiments in accordance with principles of inventive concepts, the portable electronic device employs voice recognition software to receive inputs from a vehicle user.

In exemplary embodiments in accordance with principles of inventive concepts, the partially reflective (and partially transmissive, or transparent) minor may comprise an electrically switchable transreflective minor, for example. In such exemplary embodiments, the tactile input device may include a wireless interface for communication with a controller for the electrically switchable transreflective minor. The controller and wireless interface may be mounted, for example, in the mount.

In exemplary embodiments in accordance with principles of inventive concepts, a system for providing information to a driver in a vehicle including a dashboard and a steering wheel includes a smartphone with a display that is configured to carry out two-way communications with other devices and programmable control, a combiner glass capable of partial and electronically adjustable reflective properties that reflects the device display into the field of view of the driver as a heads-up display for the driver, an enclosure that supports the device upright aligning it with the combiner glass to reflect the image of the device, a tactile input device that generates signals representing the location of the driver's finger on the input device and signals representing the actuation of an entry key or reception of voice commands from the driver/user by voice recognition software employed by the portable device, a bracket means for releasably attaching the tactile input device to the steering wheel, and wireless interface for enabling communications between the programmable mobile telephone and the tactile input device whereby images on the first and second displays and responses to manipulation of the tactile input device are processed by the programmable control.

In exemplary embodiments in accordance with principles of inventive concepts a mobile telephone includes telephone input means for enabling a user to provide input thereto and said programmable control defines a driving mode wherein the tactile input device is the sole source of input by the driver and the telephone input means is disabled and a non-driving mode wherein the telephone input means is enabled.

In exemplary embodiments in accordance with principles of inventive concepts a tactile input device includes a touch sensitive pad for allowing contact-based motion detection and means for providing simulated switch/button activation in response to operations of the programmable control.

In exemplary embodiments in accordance with principles of inventive concepts a mobile device includes voice recognition software for enabling a user to provide voice command inputs whereby voice recognition is the sole or additional source of input by the driver.

In exemplary embodiments in accordance with principles of inventive concepts a display system is configured to display navigational information.

In exemplary embodiments in accordance with principles of inventive concepts a display system is configured to display musical selection information.

In exemplary embodiments in accordance with principles of inventive concepts a display system is configured to display vehicle parameters.

In exemplary embodiments in accordance with principles of inventive concepts a display system is configured to display vehicle parameters including vehicle speed.

In exemplary embodiments in accordance with principles of inventive concepts a display system is configured to be responsive to voice commands.

In exemplary embodiments in accordance with principles of inventive concepts a display system is configured to control the switchable mirror to be highly reflective when the vehicle is not traveling.

In exemplary embodiments in accordance with principles of inventive concepts a display system is configured to provide web browsing when the vehicle is not traveling.

In exemplary embodiments in accordance with principles of inventive concepts a display system is configured to collect and store data.

In exemplary embodiments in accordance with principles of inventive concepts a display system is configured to store data including, vehicle speed, vehicle location, and music information.

In exemplary embodiments in accordance with principles of inventive concepts a display system is configured to upload data to remote storage, such as cloud storage.

In exemplary embodiments in accordance with principles of inventive concepts a method of displaying includes providing a windshield mountable partially reflective mirror; providing a mount configured to accept a portable electronic device and to project the display of the portable electronic device to the windshield mountable partially reflective mirror when mounted in a vehicle; and providing a tactile input device including a wireless interface for entry of and transmission of input from a vehicle user to a device mounted in the mount, wherein the tactile input device is configured for mounting on a vehicle steering wheel.

In exemplary embodiments in accordance with principles of inventive concepts a method of displaying includes employing a partially reflective mirror comprises an electrically switchable transreflective mirror.

In exemplary embodiments in accordance with principles of inventive concepts a method of displaying includes employing a tactile input device that includes a wireless interface for communication with a controller for the electrically switchable transreflective mirror.

In exemplary embodiments in accordance with principles of inventive concepts a method of displaying includes displaying navigational information.

In exemplary embodiments in accordance with principles of inventive concepts a method of displaying includes displaying musical selection information.

In exemplary embodiments in accordance with principles of inventive concepts a method of displaying includes displaying vehicle parameters.

In exemplary embodiments in accordance with principles of inventive concepts a method of displaying includes displaying vehicle parameters including vehicle speed.

In exemplary embodiments in accordance with principles of inventive concepts a method of displaying includes responding to voice commands.

In exemplary embodiments in accordance with principles of inventive concepts a method of displaying includes controlling a switchable minor to be highly reflective when the vehicle is not traveling.

In exemplary embodiments in accordance with principles of inventive concepts a method of displaying includes providing web browsing when the vehicle is not traveling.

In exemplary embodiments in accordance with principles of inventive concepts a method of displaying includes collecting and storing data.

In exemplary embodiments in accordance with principles of inventive concepts a method of displaying includes storing data including, vehicle speed, vehicle location, and music information.

In exemplary embodiments in accordance with principles of inventive concepts a method of displaying includes uploading data to remote/offsite storage, such as cloud storage.

In exemplary embodiments in accordance with principles of inventive concepts a method of displaying includes providing a device with a display configured for two-way communications with other devices and programmable control; providing a combiner glass, partially reflective that reflects the portable device display into the field of view of the driver as a heads-up display for the driver; providing an enclosure that supports the device upright aligning it with the combiner glass to reflect the image of the device; providing a tactile input device that generates signals representing the location of the driver's finger on the input device and signals representing the actuation of an entry key; providing a bracket for releasably attaching the tactile input device to the steering wheel, and providing wireless communications means for enabling communications between the programmable mobile telephone and the tactile input device whereby images on the first and second displays and responses to manipulation of the tactile input device are processed by the programmable control.

In exemplary embodiments in accordance with principles of inventive concepts a method of displaying includes employing a telephone input means for enabling a user to provide input thereto and said programmable control defines a driving mode wherein the tactile input device is the sole source of input by the driver and the telephone input means is disabled and a non-driving mode wherein the telephone input means is enabled.

In exemplary embodiments in accordance with principles of inventive concepts a method of displaying includes employing a tactile input device includes a touch sensitive pad for allowing contact-based motion detection and means for providing simulated switch/button activation in response to operations of the programmable control.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 11F is a dashboard view of another embodiment of the built-in heads up display system with the dock displaced below the dashboard gauge visor, in accordance with aspects of the inventive concept;

FIG. 21 shows another embodiment of an image projection medium, in accordance with aspects of the inventive concept.

DETAILED DESCRIPTION

Figure 1:
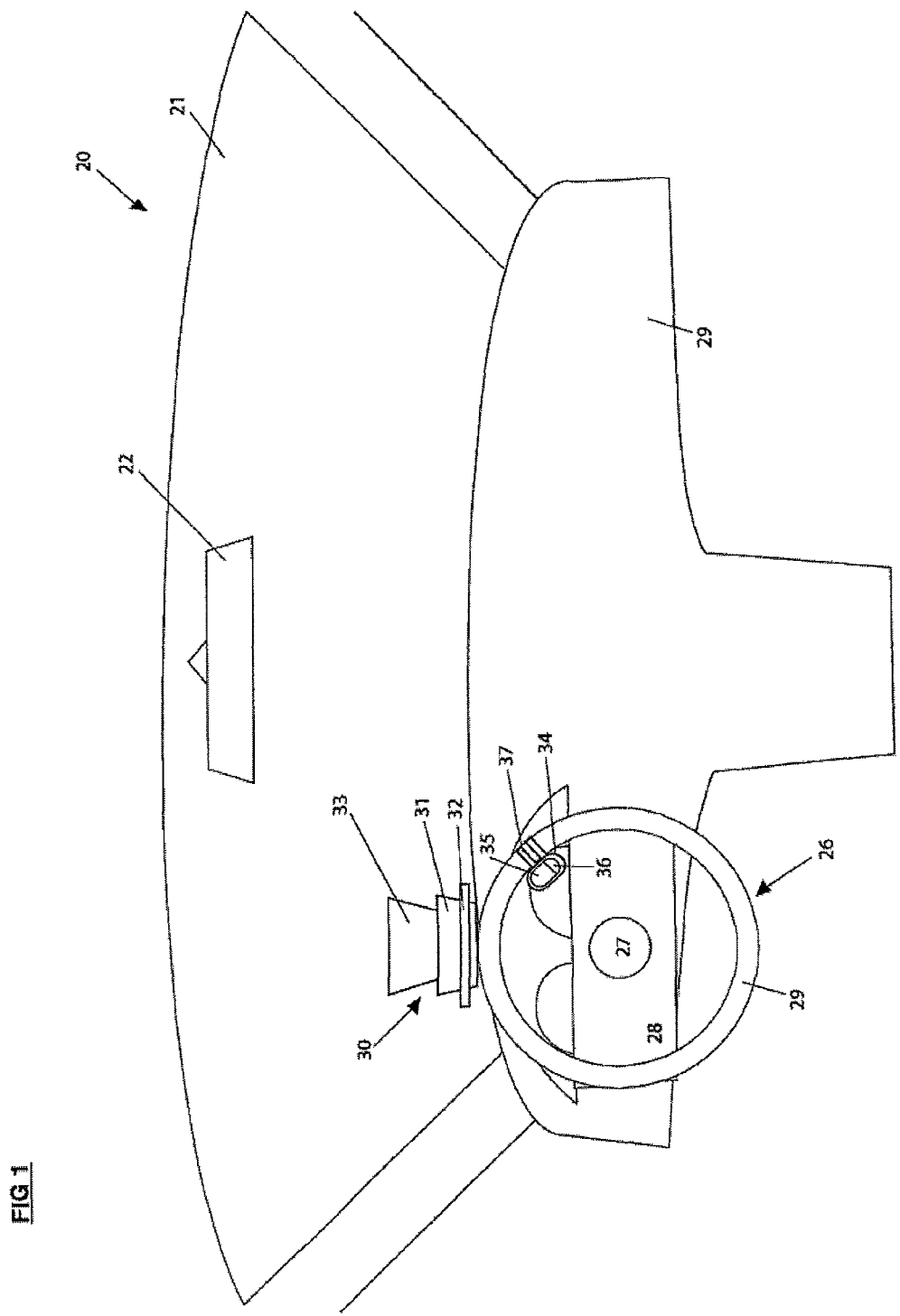
FIG. 1 is a representation of a driver's view of a dashboard and windshield of a vehicle that incorporates a heads up display system, in accordance with aspects of the inventive concept.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device and are not intended to limit the scope of the present inventive concept.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In exemplary embodiments in accordance with principles of inventive concepts a heads-up display system includes a heads-up-display for use in a vehicle, such as an automobile, truck, boat, plane, heavy equipment, farm implement, forestry harvester, or other vehicle. The heads-up-display, which can include display medium that is semi-transparent or that projects a display from a portable electronic device, allows an operator to view information provided, for example, from a smartphone without interfering with his view of the road ahead. In various embodiments, an operator may interact with the heads-up-display via a tactile input device that may be mounted, for example, on a vehicle steering wheel to provide convenient access to operation of the heads-up-display and/or the smartphone from which information is being displayed.

In exemplary embodiments in accordance with principles of inventive concept, the heads up display system may integrate a plurality of functions, such as GPS navigation, text messaging, music management, and/or voice telephone calls into one system. Such a system may provide a heads up display with voice command and/or tactile interface for user interaction that requires only low levels of attention and that, consequently, requires only a low level of user attention. Voice commands and/or tactile inputs available to a user can include, but are not limited to, "navigate," "speedometer," and "call," as examples. A user's music library, contact list, and other assets available in his smartphone may be available through a system in accordance with principles of inventive concepts and those assets may be available through voice commands, for example, to locate and play a song, or to send a text message or voice call to a selected contact. In accordance with principles of inventive concepts, background data, such as speed, location, and usage may be collected and stored locally then uploaded to a cloud server for analytical purposes, for example.

In exemplary embodiments in accordance with principles of inventive concepts, images provided by the heads-up-display can be collimated and, as a result, the images appear to be projected out in front of the display, e.g., at optical infinity, and an operator's eyes do not need to refocus between viewing the display and the outside world. A system and method in accordance with principles of inventive concepts may include a collimator specifically adapted to collimate images from a device with which the system operates. Additionally, although collimated and, as a result, at optical infinity, the image may appear to be projected at various distances in front of the vehicle, in a range of from one to twenty feet in front of the windshield, for example.

In exemplary embodiments in accordance with principles of inventive concepts, a mobile device may send visible graphic, alphanumeric, or other image data in the form of images to a projector, such as a pico-projector. The projector projects the imagery through an optical assembly that collimates the imagery, thereby providing the collimated imagery to a user at any depth of field within the user's field of vision. In accordance with principles of inventive concepts, the projector may project the imagery through an optical assembly that collimates the projected imagery/data while focusing on a specific point in space in the field of view or depth of field of the user, where the user may view the imagery having the appearance of being projected at a specific distance in front of the vehicle windshield, for example.

FIG. 1 depicts a portion 20 of the interior of an automobile cabin, e.g., as viewed from a front seat. Windshield 21, rear view mirror 22, dashboard 23, vents 24A, 24B, 24C, and 24D, an instrument cluster 25, and steering wheel 26 are included in this exemplary embodiment. The steering wheel 26 includes a hub 27, radial spokes 28 and an outer ring 29. This exemplary embodiment of a vehicle cabin is for illustrative purposes and inventive concepts are not limited thereto.

An exemplary embodiment of a heads-up display system in accordance with principles of inventive concepts includes a dash- or windshield-mounted assembly 30 that includes a bracket 31 that mounts to the windshield or dashboard 24A. The bracket 31 supports a smartphone with the screen facing up 32 and a combiner glass 33, described in greater detail in the discussion related to FIG. 6, that reflects the image of the smartphone onto the combiner glass 33 where the image of the smartphone is semi-transparently overlaid on a segment of the view of the area (road, for example) ahead of the vehicle. Bracket 31 may be adjustable in a plurality of planes, thereby allowing for fine adjustment of the smartphone/heads-up-display interface. An input assembly 34 includes a tactile device 35 with a touch pad 36 and an input, or "enter," key 37. A bracket 38 attaches the tactile device 35 to the outer ring 29 of the steering wheel 26. In the exemplary embodiment in accordance with principles of inventive concepts of FIG. 1, the input assembly 34 is mounted for a right-handed driver. The input assembly 34 can also be readily mounted on the other side of the steering wheel 26 for a left-handed driver.

To use the heads-up display system the driver initiates a heads-up display control application in the smartphone 32 and establishes a driving mode. A driving mode may provide visual and audio output that gives detailed driving instructions, for example. The visual output may differ from that which would normally be found in a navigational application. For example, in order to compensate for being projected from the smartphone to the reflective surface of a heads-up-display, the image may be rotated and reversed from what would normally be displayed for direct viewing. The display may be altered in other aspects as well, with, for example, street grids or other details eliminated and only essential elements (left or right turn arrow) displayed. In driving mode, the functions and applications are limited to the heads-up display control application and other applications the heads-up-display control application references during operation. Images projected onto the windshield combiner glass 33 contain essential information from which the driver can make a selection using the input assembly 34. In exemplary embodiments in accordance with principles of inventive concepts, a driver may make a selection by moving a finger, such as the thumb, over the touch pad 36 to highlight an option and then depresses the input key 37 to invoke the selection without having to look at the input assembly 34, thereby minimizing any visual, manual or cognitive distractions during such operations.

Figure 2:
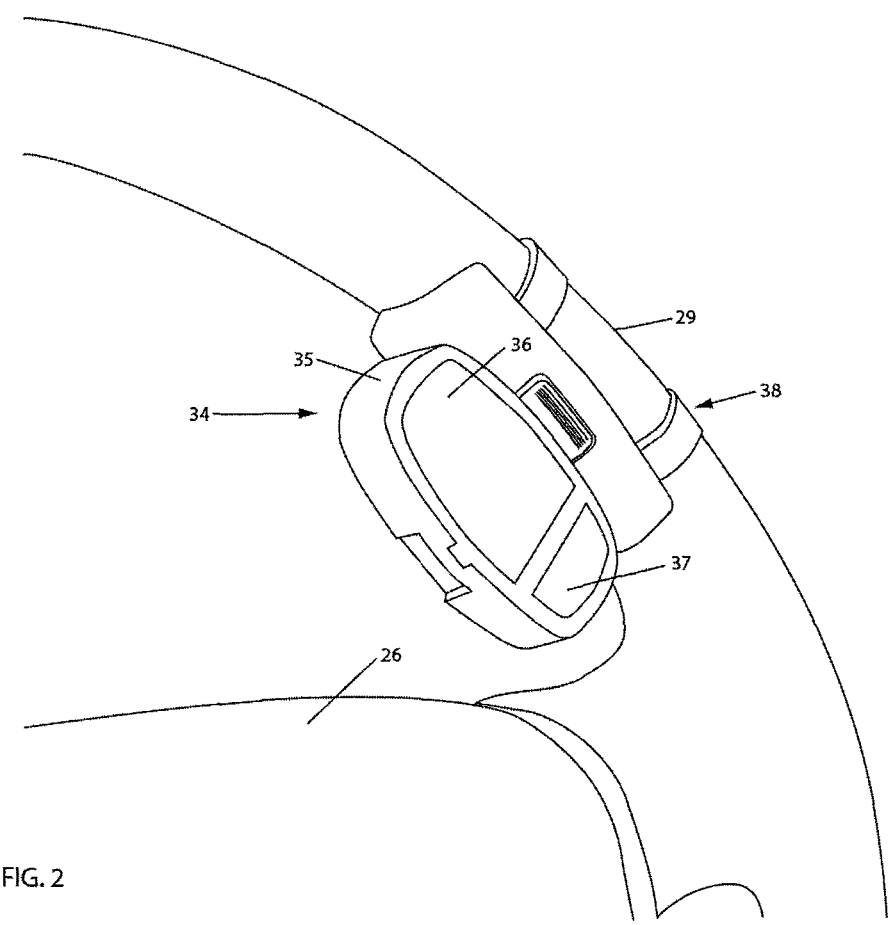
FIG. 2 is a perspective view of an input assembly mounted to a steering wheel for use with the heads up display of FIG. 1, in accordance with aspects of the inventive concept.
Figure 3:
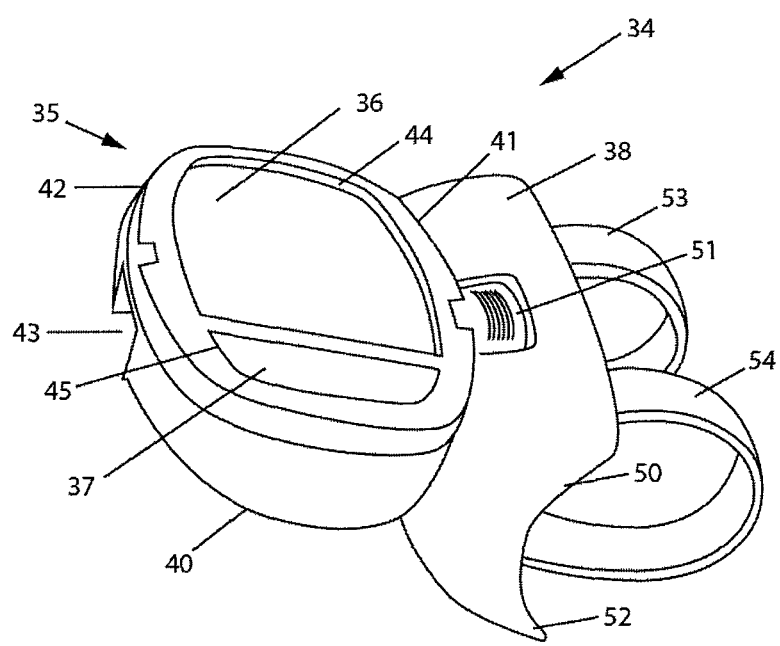
FIG. 3 is a perspective view of the input assembly of FIG. 2.
Figure 4:
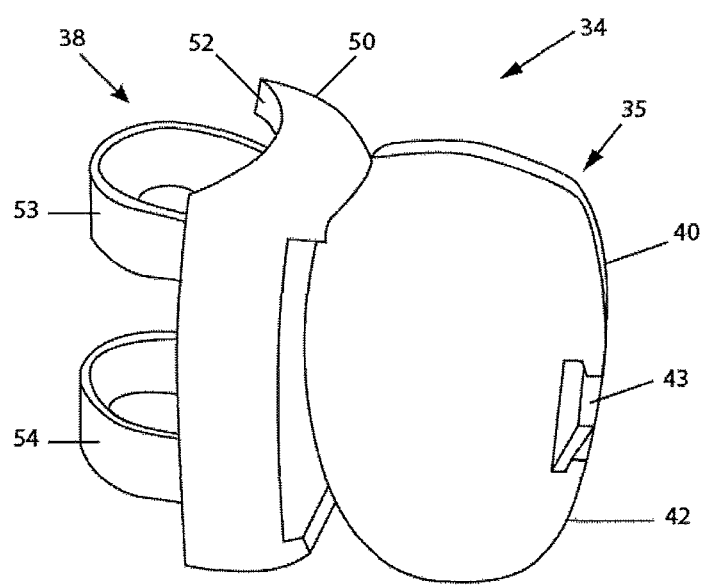
FIG. 4 is a rear perspective view of the input assembly of FIGS. 2 and 3.
Figure 5:
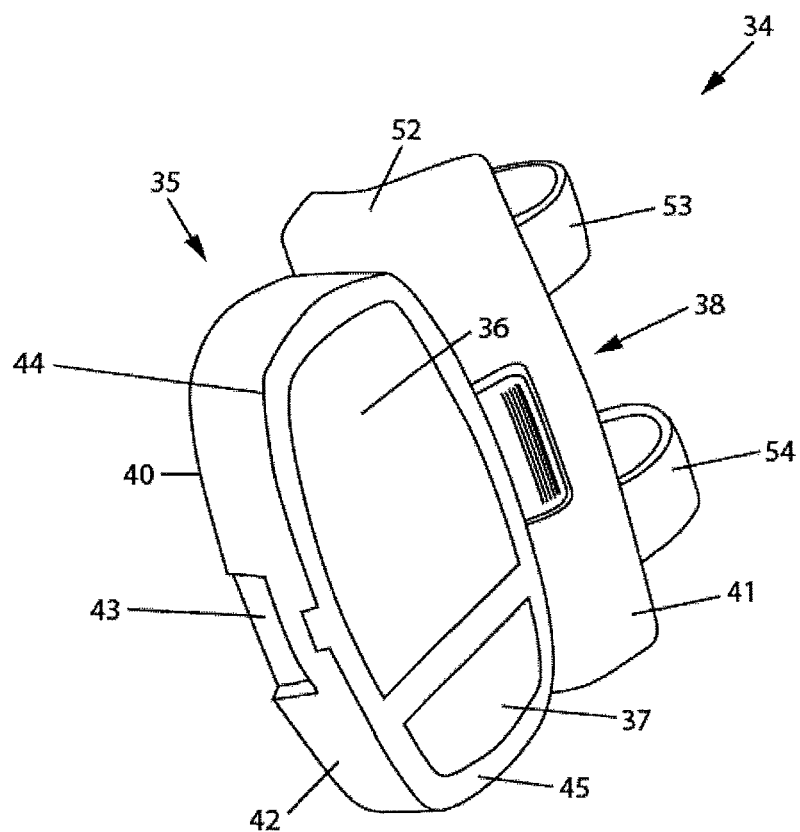
FIG. 5 is a front perspective view of the input assembly of FIGS. 2 and 3.

FIG. 2 depicts an exemplary embodiment of an input assembly 34 in accordance with principles of inventive concepts attached to the outer ring 29 of steering wheel 26. FIGS. 3-5 provide different views of input assembly 34, including details of the structure of the tactile device 35 and the bracket 38. Referring to FIGS. 3 and 5, the tactile device 35 includes a housing 40 with an elongated ovoid shape. Each of the sides 41 and 42 includes a mounting structure 43 that interfaces with a complementary mounting structure on the bracket 38 whereby the tactile device 35 is detachable from the bracket 38. Bracket 38 is an exemplary embodiment and inventive concepts are not limited thereto. Housing 40 includes a front opening 44 that frames the touch pad 36. Another opening 45 frames the enter key 37.

In this exemplary embodiment, bracket 38 includes a body portion 50 having a release 51 that complements the mounting structure 43 and tactile device 35 snaps into the corresponding edge of the bracket body portion 50. Depressing the release 51 allows the tactile device 35 and the bracket 38 to separate. The opposite sides of the housing forms a curved body structure 52 that adapts to the outer ring 29 of a steering wheel 26 as shown in FIG. 2. Straps 53 and 54 are molded with the body portion 50 to wrap around the steering wheel outer ring 29 and be received in a capture mechanism (not shown). In accordance with principles of inventive concepts, such strapping or securing mechanisms brackets may be designed to be easily releasable from the outer ring of the steering wheel.

The bracket 38 is also symmetrical around a horizontal central axis. Consequently, the bracket 38 can be positioned on either side of the steering wheel 26 and can receive and capture the tactile device 35 in an orientation on the steering wheel for either right-or left-handed driver. Any number of different capture mechanisms for brackets 38 could be substituted. In accordance with principles of inventive concepts, as shown in FIG. 2, the input assembly 34 may be placed proximate to the driver's normal hand position on the outer ring 29 of a steering wheel. Substantially no movement of the hand is necessary to swipe the touch pad 36 or depress the enter key 37.

In exemplary embodiments in accordance with principles of inventive concepts, tactile device 35 also contains electronic circuitry for sensing the passage of a thumb or other finger across the touch pad 36 and for sensing the depression of the enter key 37. The housing 40 also includes a communications system, which may be a wireless communications system, for communicating with a corresponding system in the smartphone. The Bluetooth system is one example of such a wireless communication system. Typically the tactile device 35 will include a battery power supply and an on/off switch.

Figure 6:
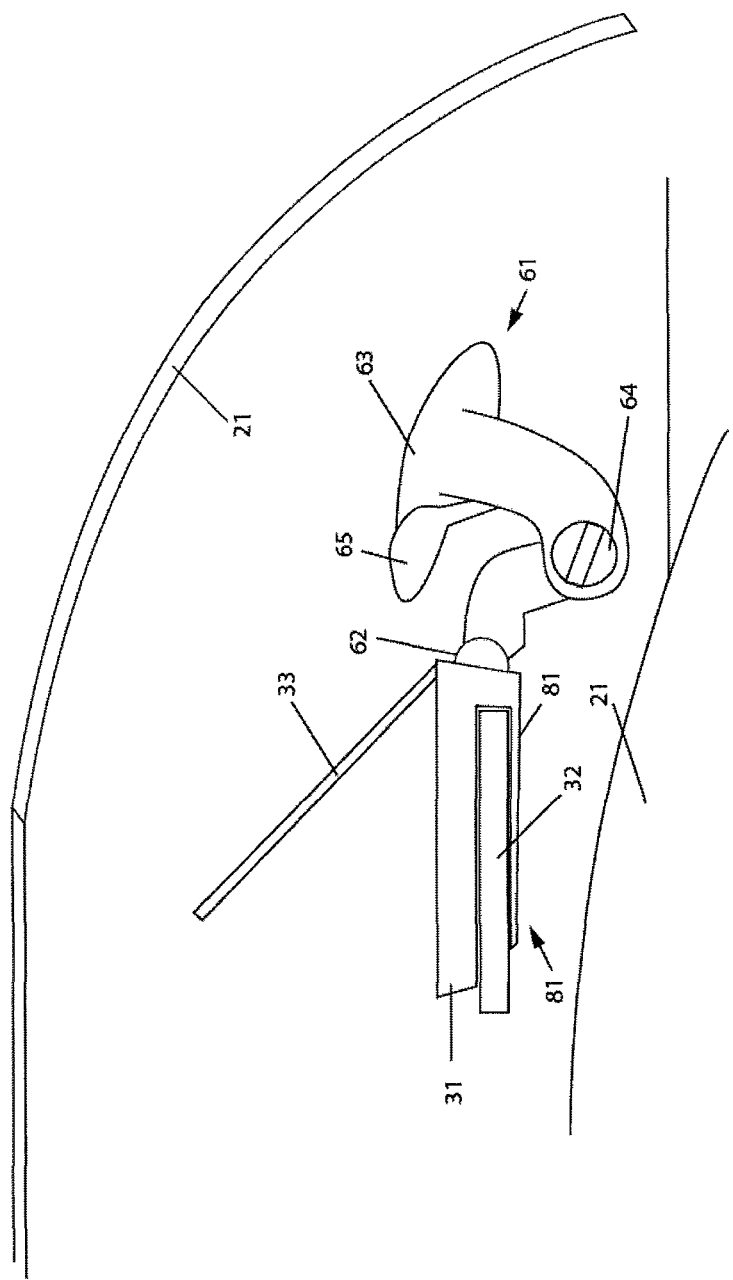
FIG. 6 is a side view of a heads up display device with a smartphone mounted therein couple to a windshield of a vehicle, in accordance with aspects of the inventive concept.
Figure 7:
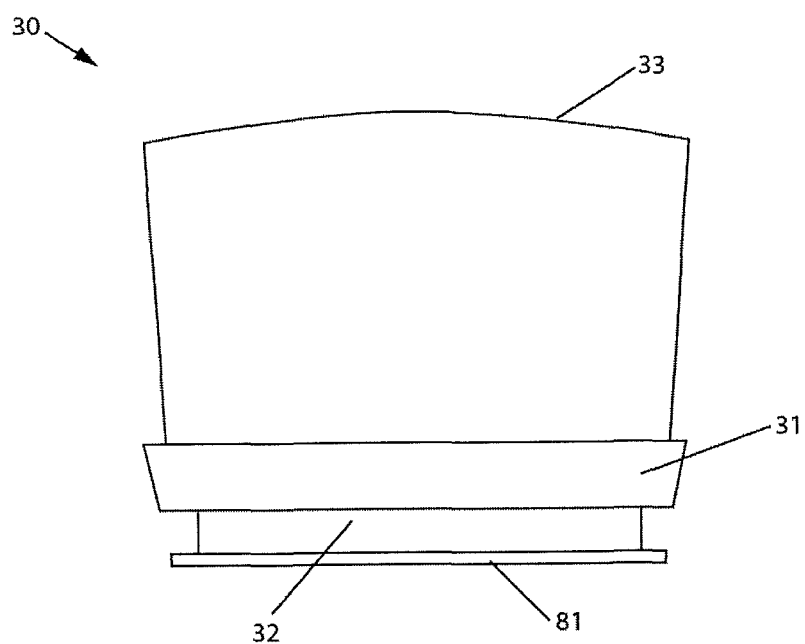
FIG. 7 is a front view of the heads up display of FIG. 6 with the smartphone mounted therein.
Figure 8:
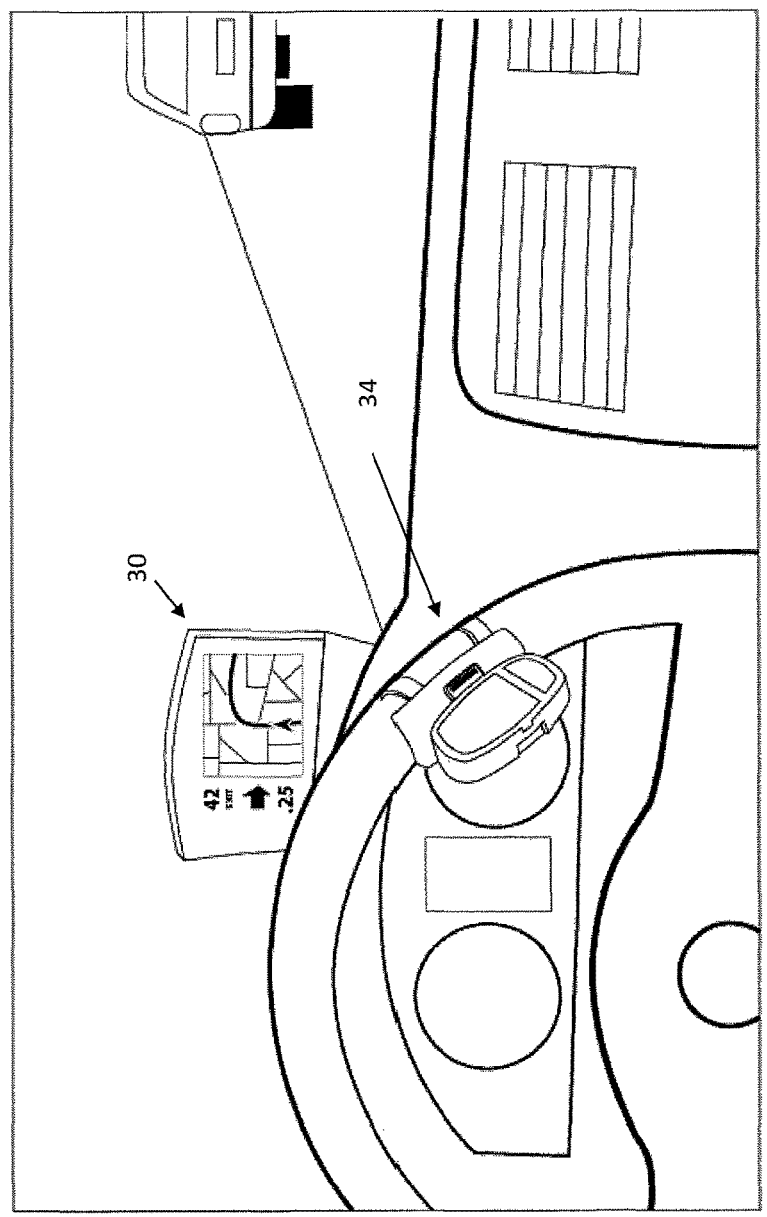
FIG. 8 is a view of a dashboard and steering wheel of the vehicle of FIG. 6 with the heads up display and input assembly.

Now referring to FIGS. 6-8, an exemplary embodiment of an optical assembly 31 in accordance with principles of inventive concepts of a heads up windshield mounting assembly 30 includes a partially reflective glass 33, a windshield mounting mechanism 61, a portable electronic device, such as a smartphone 32, and enclosure 81. In this exemplary embodiment, the windshield mounting mechanism 61 includes a pivot 62 and a suction cup 63.

Enclosure 81 carries the smartphone 32. In exemplary embodiments in accordance with principles of inventive concepts, a smartphone is inserted into the phone receiver 82 facing up with the control application software open and running The enclosure 81 attaches to a pivot 62 to provide flexible positioning options. A locking mechanism 74 locks the enclosure 81 relative to the mounting mechanism 61. As can be particularly recognized from FIG. 1, the structure in FIGS. 6-8 is compact and is readily mounted to a dashboard or windshield in a position that will not interfere with a driver's operation of a motor vehicle.

In exemplary embodiments in accordance with principles of inventive concept, a driver initiates operation of an application that controls operation of the heads-up-display by energizing the smartphone 32 and the tactile device 35 and by attaching the smartphone 32 to the phone receiver 82 in the optical assembly 31. An initial display then appears on the combiner glass 33 shown in FIG. 1.

Figure 9A:
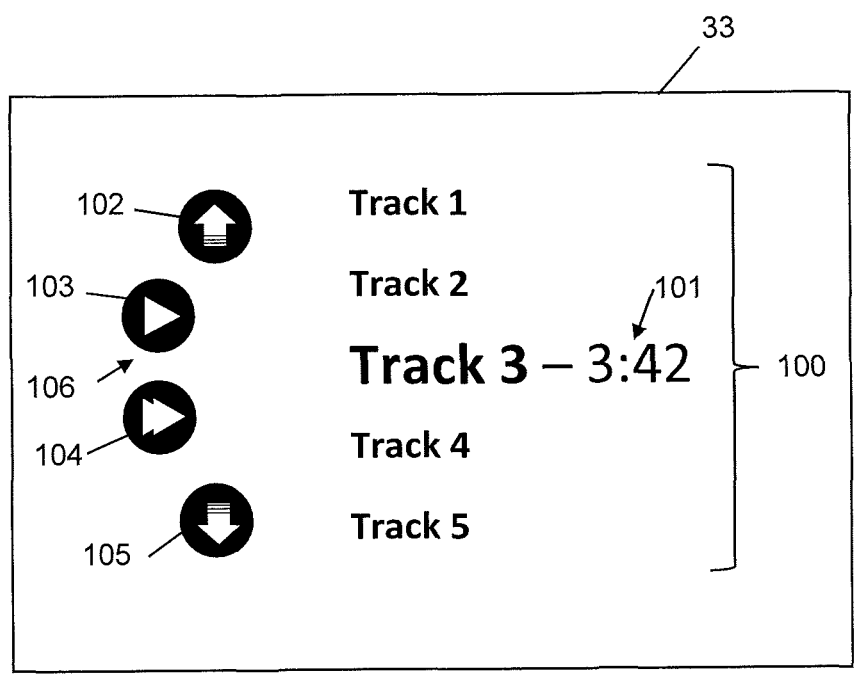
FIG. 9A is a view of an embodiment of a music control output presented via the heads up display system, in accordance with aspects of the inventive concept.

In accordance with principles of inventive concepts, any initial display that is inverted could be used, but, for illustrative purposes, the first display can be a music control screen shown in FIG. 9A. A music player control application connects to music files on a portable electronic device, such as a smartphone 32 or music files on the interne by means of the carrier connection included in the smartphone 32. In this exemplary embodiment, the display includes a portion 100 of a track list, with a selected track highlighted at 101 as shown for Track. The driver also sees four control buttons to the left of the display of FIG. 9A. A first control button 102 causes the track selection to scroll up the list. A second button 103 causes the music player application to switch between a play mode and a pause mode. Button 104 provides a skip function that causes the player application to skip to a next track. Button 105 performs a scroll down function that causes the track selection to move down the list.

In FIG. 9A the button 103 is highlighted as shown at 106. While viewing this image on combiner glass 33 of the windshield, the driver may engage the Enter key 37 to toggle the operations between the play and pause modes. If the driver wants to skip a track, a downward swipe on the touch pad 36 produces a "down arrow" function whereupon the button 104 is highlighted. While highlighted, any activation of the Enter key 37 causes the skip function to occur.

As described above, controlling music with a tactile device 35 and display in accordance with principles of inventive concepts, such as that in FIG. 9A causes only minimal driver distraction. The driver can observe the display in FIG. 9A while maintaining eye contact with the roadway. While swiping the touchpad 36 and clicking to enter key 37 the driver's hand need not be removed from the steering wheel. Consequently, such operations minimize visual distractions, manual distractions and cognitive distractions.

In order to look at another screen, the driver swipes his or her thumb across the touchpad 36 in a transverse, or horizontal, direction. The control application interprets this action as a left arrow or right arrow type of operation and selects an adjacent display, such as navigation display 110 in FIG. 9B that appears in the combiner glass 33 (also referred to herein as windshield portion 33). This illustrative example assumes that the navigation system has been initialized to input a destination prior to switching the system to a driving mode. As shown, this display contains minimal content, namely a road map 111 of the vicinity, a display 112 that identifies the next point (waypoint), a display 113 that indicates the direction of any turn at that waypoint, and a display 114 that indicates the distance to that waypoint. Again, visual, manual and cognitive distractions are minimized.

A system in accordance with principles of inventive concepts can also utilize the communications capability of a portable electronic device such as a smartphone in handling incoming text messages, emails and data. When the smartphone 32 processes an incoming text message or email, it extracts the sender's telephone or email address as appropriate. The system also switches the display to a communications screen, such as that shown in FIG. 9C. Whatever apps are then controlling these displays in FIGS. 9A and 9B continue to operate and the interrupted display will return. In this exemplary embodiment in accordance with principles of inventive concepts, block 121 displays the telephone number or email address. The balance of the display includes buttons 122-125 allow a user to select from among various communications modes, such as text mode, or yes or no response, for example.

In exemplary embodiments in accordance with principles of inventive concepts, using the same selection process as described with respect to FIG. 9 A, button 122 is selected for the text in the email or text message to be converted to speech so the driver can listen to the message. Many times there is a question that needs to be answered with a simple "yes" or "no". Selecting the button 123 causes the system to transmit and return an affirmative response by corresponding text message or email. Selecting button 124 causes a negative answer to be returned. These buttons can also be customized to provide other messages as the driver may desire. For example, button 125 also transmits a customizable message. As an example, selecting button 125 could return a message indicating that the driver is actually driving and will respond in the future.

Figure 9B:
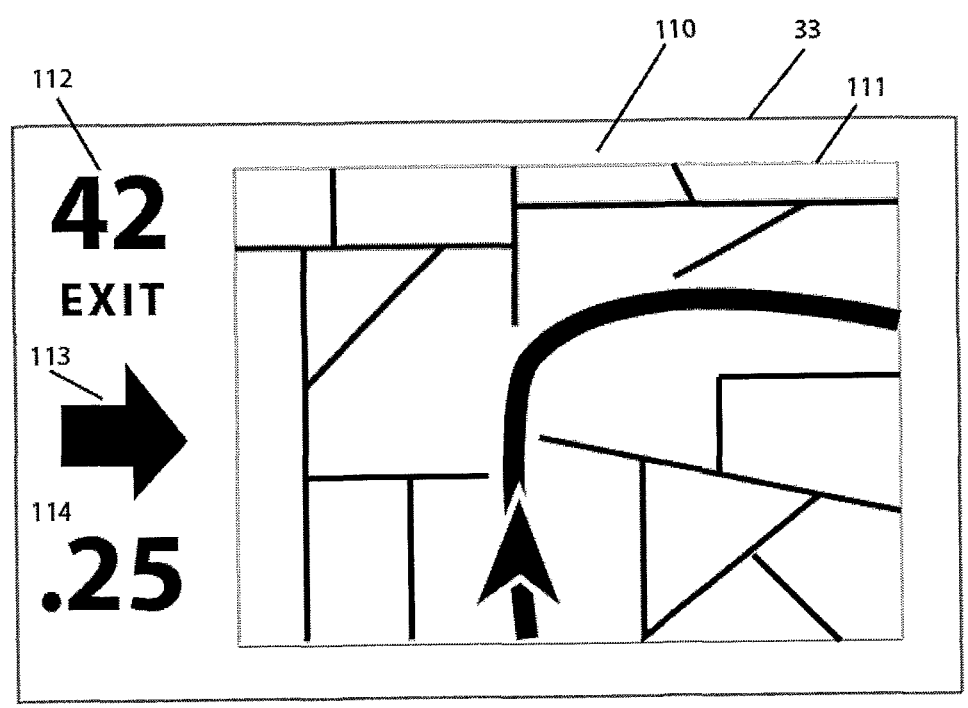
FIG. 9B is a view of an embodiment of a navigation output presented via the heads up display system, in accordance with aspects of the inventive concept.
Figure 9C:
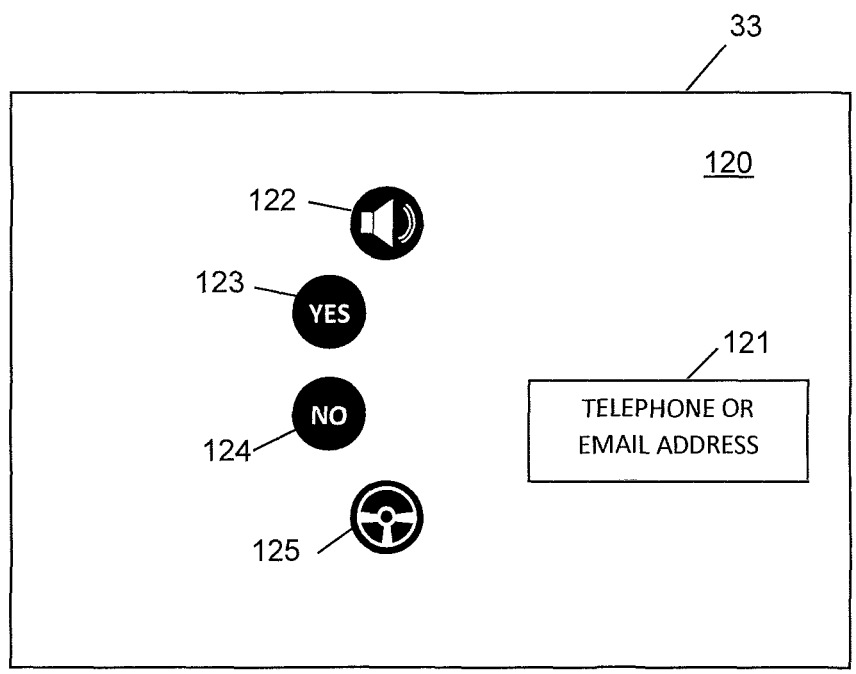
FIG. 9C is a view of an embodiment of a communication control output presented via the heads up display system, in accordance with aspects of the inventive concept.

Exemplary embodiments of inventive concepts have been described in the context of displaying three different panels as shown in FIGS. 9A, 9B and 9C. However, inventive concepts are not limited thereto. For example, a system and method in accordance with principles of inventive concepts can generate displays that are specific to unique needs of user groups. Such a display would allow a company to communicate with individual drivers with information that is tailored to that company, for example. Vehicle speed and other characteristics (for example, rpm, engine temperature, etc.) may be displayed along with other information and telephone calls may be executed while other applications, such as a navigational application, are running, for example.

Figure 10:
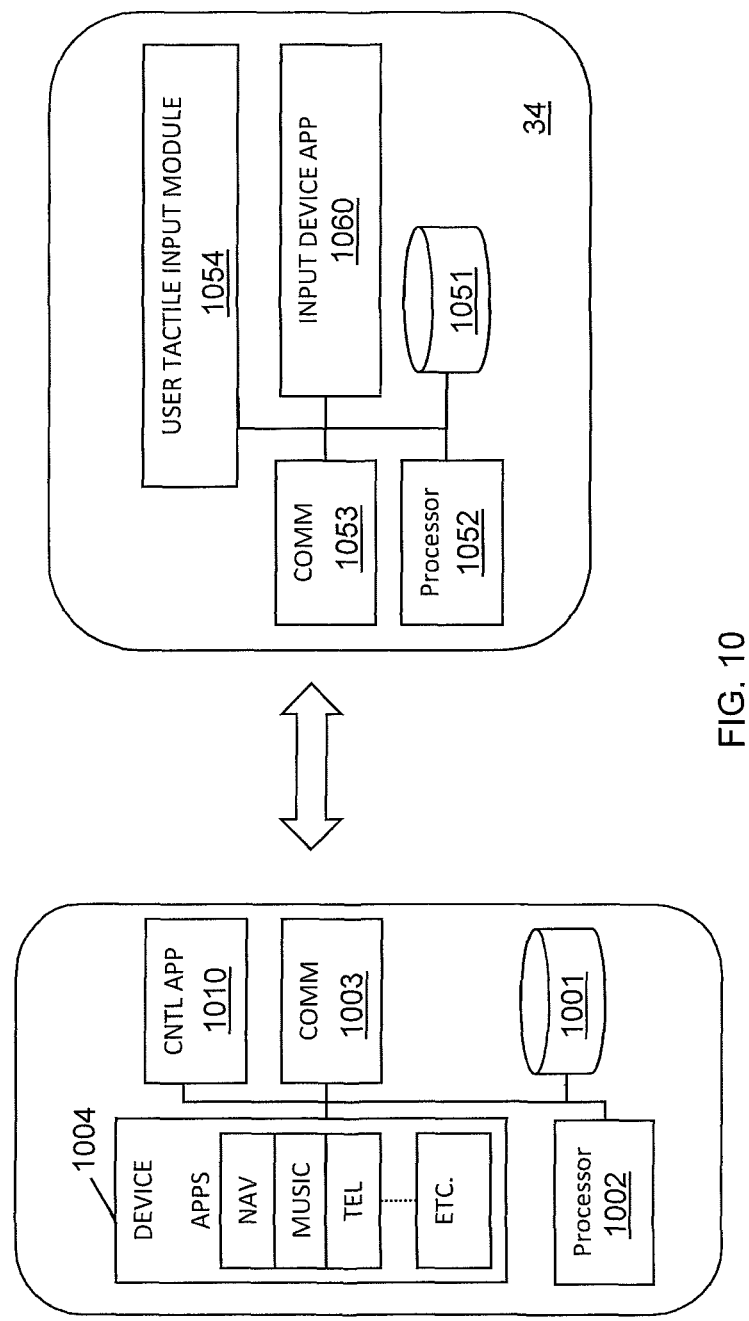
FIG. 10 is a block diagram showing an embodiment of various functional modules that can be included in a vehicle use portable heads-up display system, in accordance with aspects of the inventive concept

To use the heads-up display system 10 the driver can initiate a heads-up display control application in the mobile device 32 and establish a driving mode, e.g., see control application 1010 in FIG. 10. In this mode, the functions and applications of the mobile device 32 can be limited to the heads-up display control application 1010 and other applications it references during operation, see 1004 in FIG. 10.

Images projected onto the combiner glass 33 preferably contain essential information from which the driver can make a selection using the input assembly 34. Specifically, the driver makes a selection by moving (or swiping) a finger, such as the thumb, over the tactile input device, which can be a touch pad 36, to highlight an option. With an option highlighted, the user can select the option using a selection mechanism, which could have the form of a depressible input (or "enter") key 37, to invoke the selection without having to look at the input assembly 34, thereby minimizing any visual, manual or cognitive distractions during such operations.

Referring also to FIG. 10, the tactile device 35 also contains known electronic circuitry and functionality for sensing the passage of a thumb or other finger across the touch pad 36 and for sensing the depression of the enter key 37, e.g., see user tactile input module 1054 of FIG. 10. The housing 40 also includes a wireless communication system for communicating with a corresponding system in the mobile device, e.g., see communications module 1053 of FIG. 10. A Bluetooth system is one example of such a wireless communication system that can be used between a portable electronic device and the input assembly 34 and its tactile device 35.

Typically, the tactile device 35 will include a battery power supply and a switch, as well as a processor 1052 and memory 1051. Typically, electronic device 32, such as a mobile device, will include a memory 1001, a processor 1002, a wireless communications module 1003; and a set of applications 1004, e.g., for navigation, music or other audio play, telephone, texting, social media, and so on.

In various embodiments, a control application 1010 may be installed on the electronic device 32 which interfaces with the input assembly functionality. For example, the control application 1010 can wirelessly receive electronic device control signals from the input assembly 34, which were generated from user tactile interaction with the touch pad 36. The control application 1010 can then selectively inhibit or enable electronic device input mechanisms based thereon. For example, the control application could put the electronic device 32 in a "drive mode" wherein a phone touchscreen and/or keypad could be disabled. The control application could also provide instructions to an application (e.g., from 1004) being displayed on the display of the electronic device and reflected by the combiner glass 32 based on the electronic device control signals from the input assembly 34.

In various embodiments, a device in accordance with principles of inventive concepts may be incorporated into a vehicle dashboard. Such an incorporation may be temporary or fixed. For example, the portable device may be configured for mating with a receptacle in a vehicle dashboard. For example, the receptacle can be a port, slot, or compartment configured to receive the portable device (e.g., a smartphone, mini-tablet, or tablet). An image projection medium can be disposed and arrange to receive a display output of the device and project it for viewing by a user, such as a driver of the vehicle. The image projection medium can have variable positions, such as a closed state and an open state. The image projection medium can take any of the forms herein described, or take other forms.

Figure 11A:
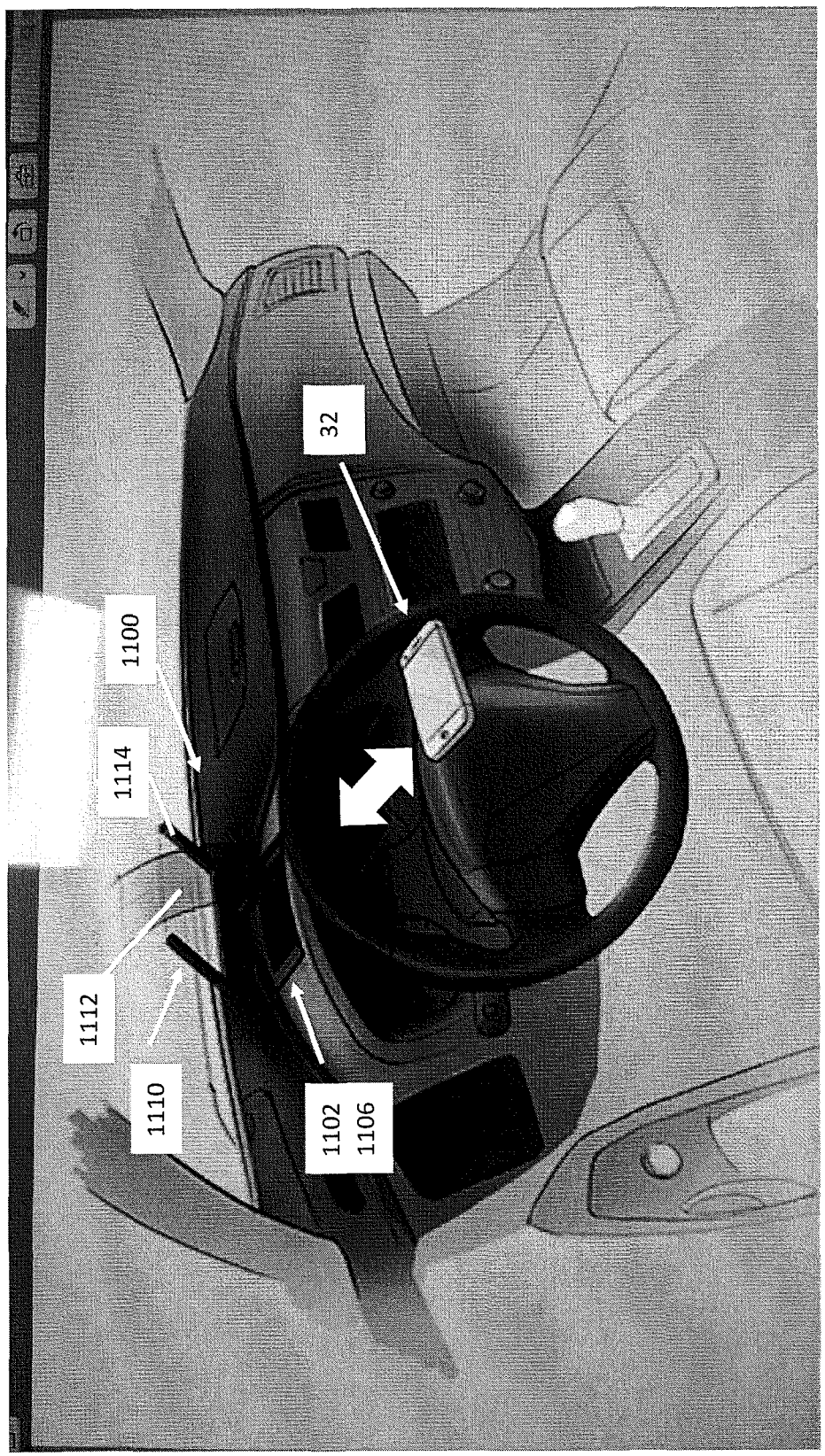
FIG. 11A is a perspective view of an embodiment of a forward portion of a vehicle compartment having a heads up display system that include a dock built into a vehicle dashboard, in accordance with aspects of the inventive concept.
Figure 11B:
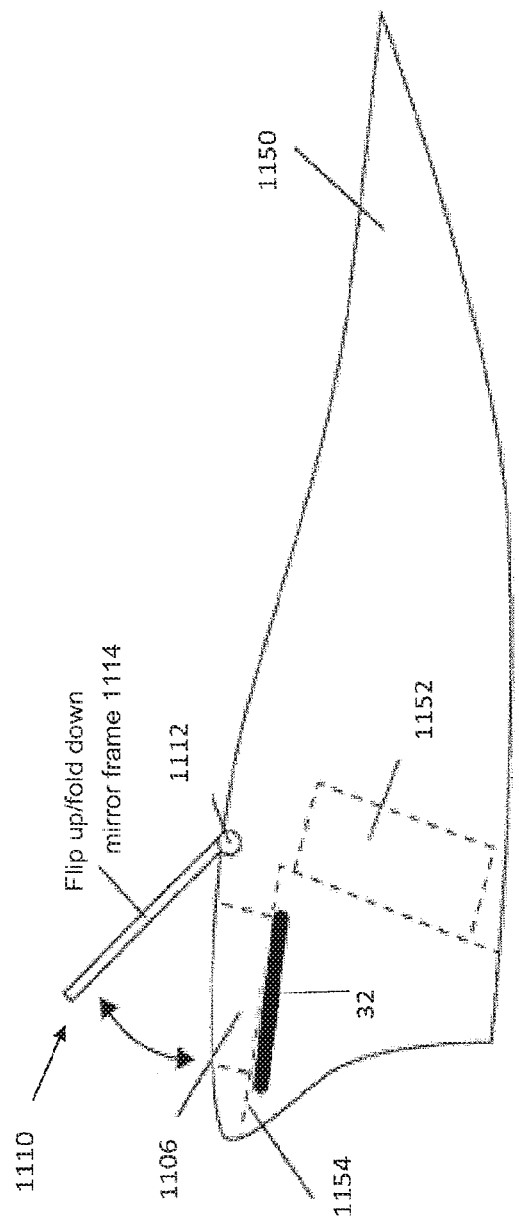
FIG. 11B is a side view of a dashboard incorporating a built-in heads up display as in FIG. 11A.
Figure 11C:
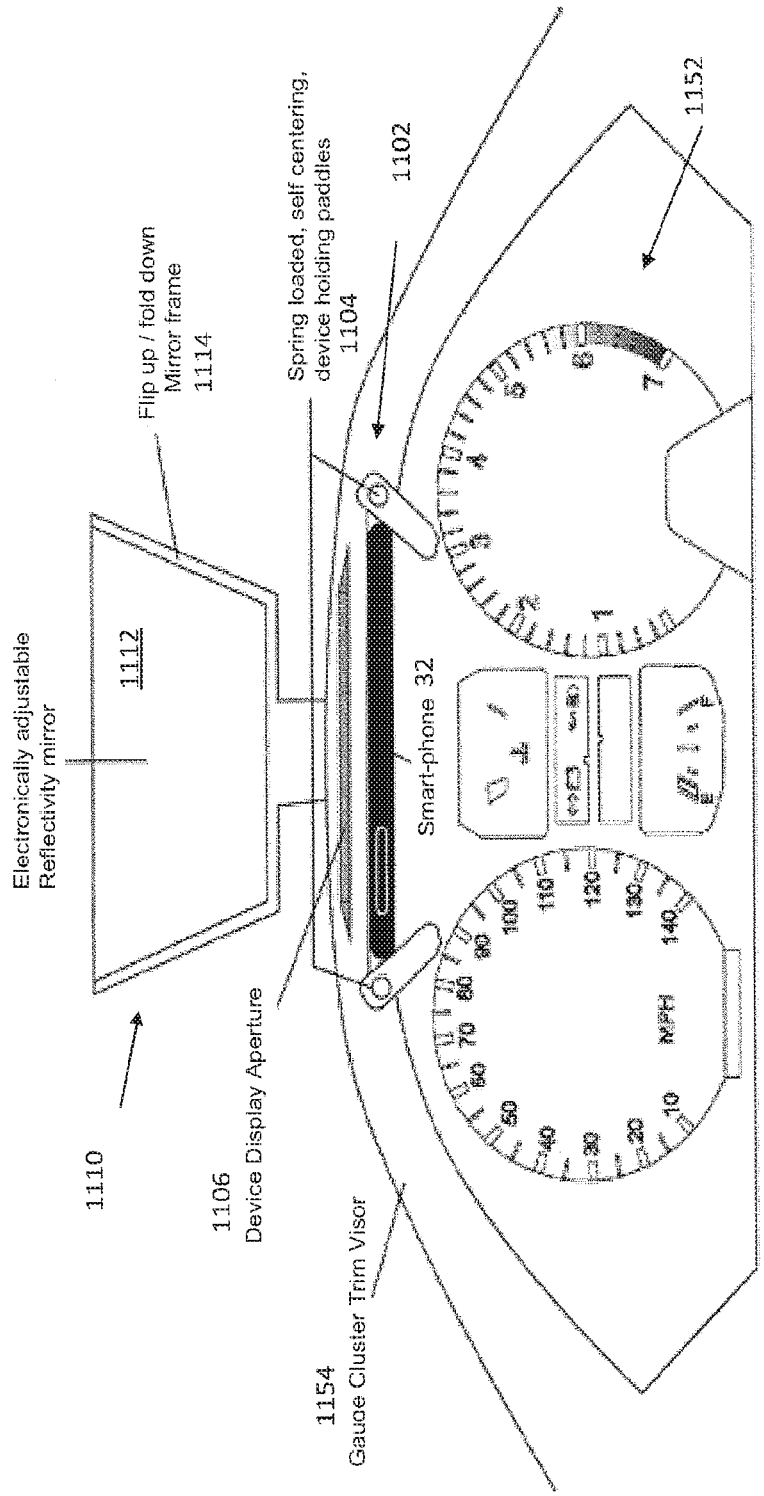
FIG. 11C is a dashboard view of the built-in heads up display system of FIG. 11A.
Figure 11D:
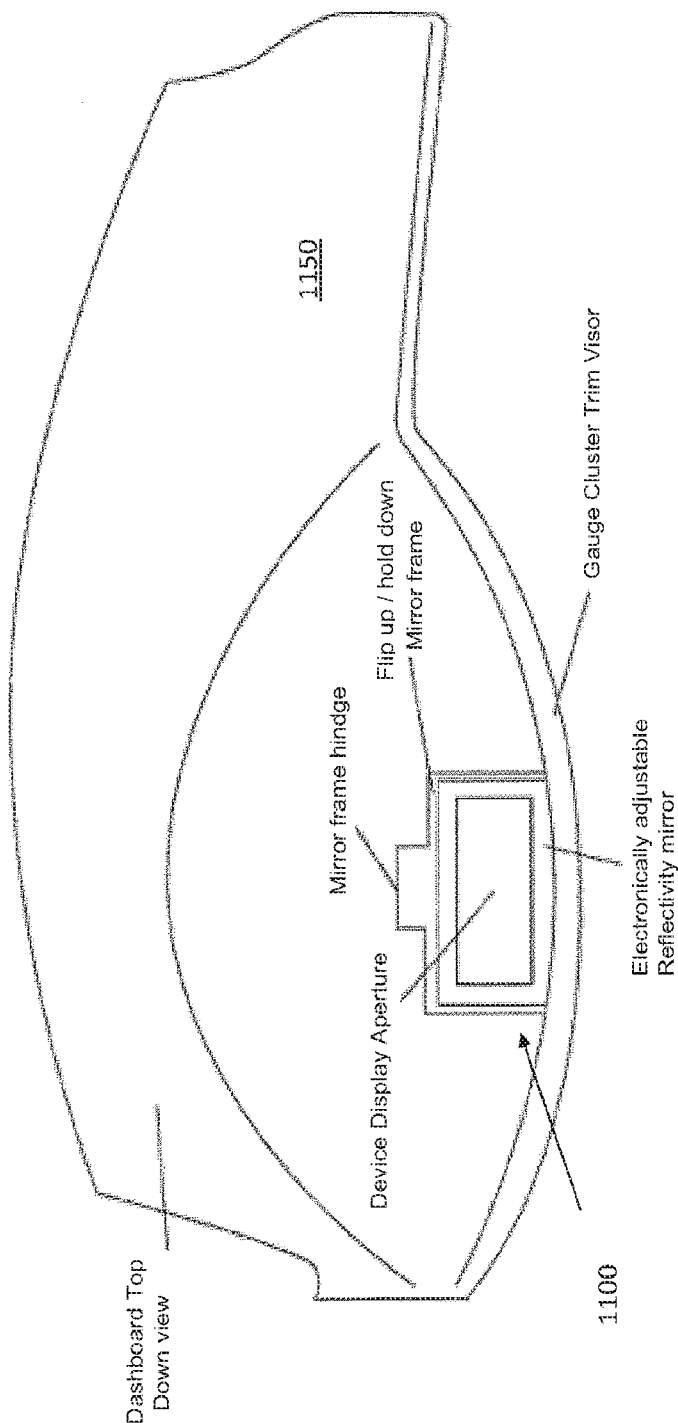
FIG. 11D is a top-down view of the built-in heads up display system of FIG. 11A with no device docked therein.
Figure 11E:
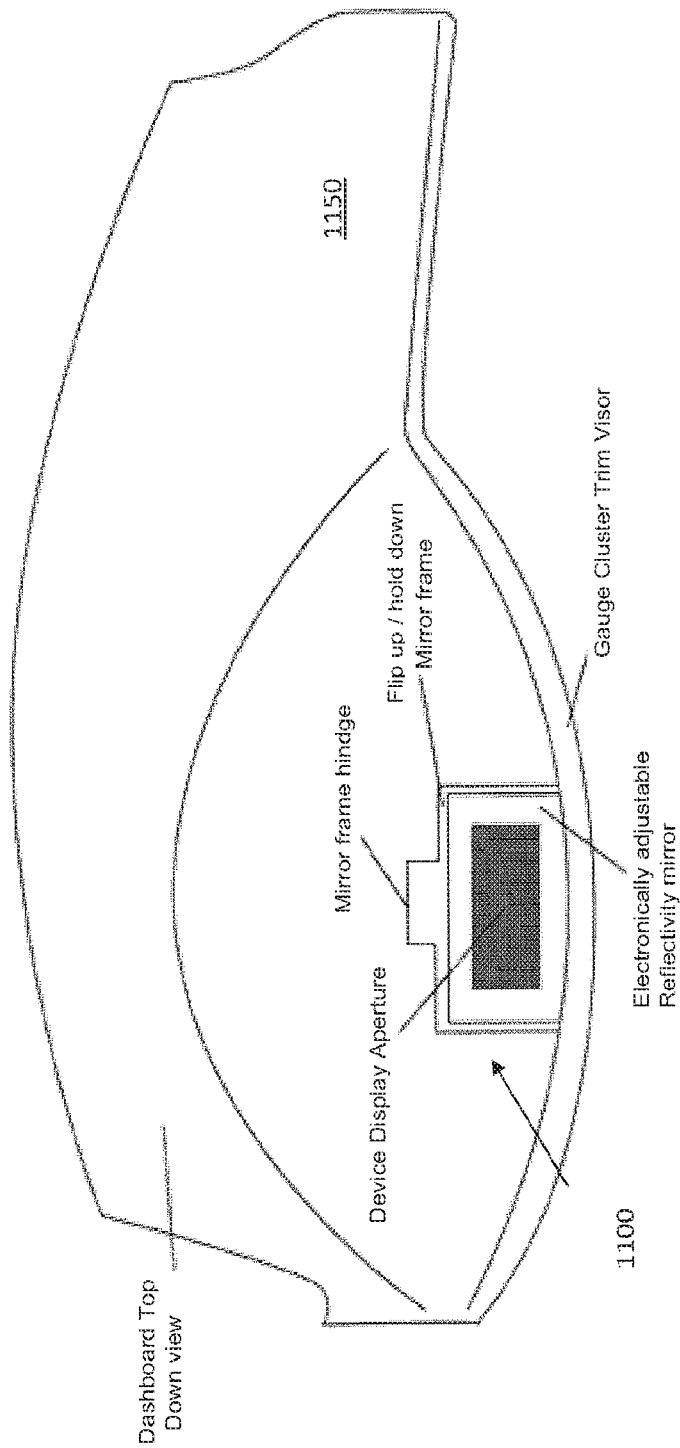
FIG. 11E is a top-down view of the built-in heads up display system of FIG. 11C with a portable electronic device docked therein.

FIG. 11A is a perspective view of an embodiment of a forward portion of a vehicle compartment having a heads up display system that include dock built into a vehicle dashboard, in accordance with aspects of the inventive concept. FIG. 11B is a side view of a dashboard incorporating a built-in heads up display as in FIG. 11A. FIG. 11C is a dashboard view of the built-in heads up display system of FIG. 11A. FIG. 11D is a top-down view of the built-in heads up display system of FIG. 11A with no device docked therein. And FIG. 11E is a top-down view of the built-in heads up display system of FIG. 11C with a portable electronic device docked therein.

In the various views shown of this exemplary embodiment, an opening in an upper portion of a vehicle dashboard allows access to a portable electronic device's (e.g., smartphone's) display for upward projection onto a screen, such as a partially transparent/reflective mirror, for the formation of an in-vehicle heads up display. The opening in the upper portion of the vehicle dashboard may be located, for example, in a gauge visor section of the dashboard, positioned for convenient viewing by the vehicle operator. The electronic device may be held under the dashboard by a spring-loaded, self-centering, universal (that is, adjustable to accommodate various sizes and shapes), holder that may include adjustable paddles, for example. In exemplary embodiments in accordance with principles of inventive concepts a portable electronic device may interface with a vehicle's electronic control unit (ECU) to provide the vehicle's diagnostic data for display on a heads-up display, for example. In exemplary embodiments, the interface between the electronic device and the vehicle's ECU may be a wireless link through the vehicle's OBDII or CANbus port, for example.

In this embodiment, the heads up display system 1100 includes a dock 1102 and a display device 1110. The dock is built-in to or integral with the dashboard 1150 in this embodiment, as a slot that can receive a smartphone 32, as an example. The dock 1102 defines a slot or compartment configured to receive and maintain the smartphone 32 and includes an aperture 1106 that allows the display from a docked smartphone 32 to project to the display device 1110 of the heads up display. The aperture 1106 can be an opening sized large enough for the smartphone display to be revealed, with a transmission path to the display device 1110 provided. The aperture 1106 may optionally include a transparent cover to, for example, protect the display of a docked smartphone.

The display device 1110 includes a display (or projection) medium 1112 and may optionally include a frame 1114 that is disposed at least partially around edges of the display medium 1112. The frame 1114 can provide stability and rigidity to the display medium 1112 to prevent warping or other damage to the display medium 1112. Alternatively or additionally, the frame 1114 could prevent chipping of edges of the display medium 1112. The display medium 1112 may be referred to as a "mirror" or projection medium, as used herein. The display medium 1112 can take the faint, in various embodiments, of the various forms of mirrors (e.g., switchable transreflective mirror), projection mediums, glass, semi-transparent, transmissive, or other mediums described herein, as examples.

A dashboard 1150 includes a gauge cluster trim visor 1154 that shield a gauge cluster 1152 under gauge cluster visor 1154. Aperture 1106 allows for the upward projection of the display of device 1108 to adjustable (flip-up, for example) partially reflective mirror 1110, which is hinged 1112 to allow for positioning adjustment to accommodate vehicle operators of various heights, or for removing the mirror 1112 from, or placing the mirror 1112 into, an operator's line-of-sight, for example.

The front plan view of FIG. 11C of dashboard 1150 shows the gauge cluster trim visor 1154 that shields the gauge cluster 1152, aperture 1106, device 32, and display medium (e.g., a partially reflective mirror) 1110, a detailed description of which will not be repeated here. In this exemplary embodiment, device 32 is held in place within dock 1102 by spring-loaded self-centering paddles 1104 under aperture 1106 for projection of display images onto partially-reflective mirror 1110. The spring-loaded paddles 1104 accommodate devices, such as smartphones, tablets or phablets, having different physical profiles and, as such, provide a universal platform positioning and securing device 32.

The top plan views of FIGS. 11D and 11E illustrate a dashboard including a heads-up vehicular display system as in FIGS. 11A-C in which the display medium 1110 is positioned in the upright and folded (down) positions, respectively. The upright position is an "open" position, such as is shown in FIGS. 11A-C. The folded (down) position is a closed position, see, e.g., FIG. 12C described below.

FIGS. 11A-11E shows a heads up display dock built into the gauge visor. In various embodiments, the dock can be formed in a top surface or portion of the visor, a bottom surface or portion of the visor, an intermediate portion of the visor. In yet other embodiments, the dock can be displaced from the visor, and preferably maintaining a display transmission path to the display medium.

FIG. 11F is a dashboard view of another embodiment of the built-in heads up display system with the dock displaced below the dashboard gauge visor. In this embodiment, the dock 1102 is located with below gauges of the dashboard 1150, e.g., on or above a steering column of the vehicle. In this figure, the phone 32 is mounted in the dock 1102. In this embodiment, the gauges are not obstructed by the dock 1102 or smartphone 32.

Figure 11G:
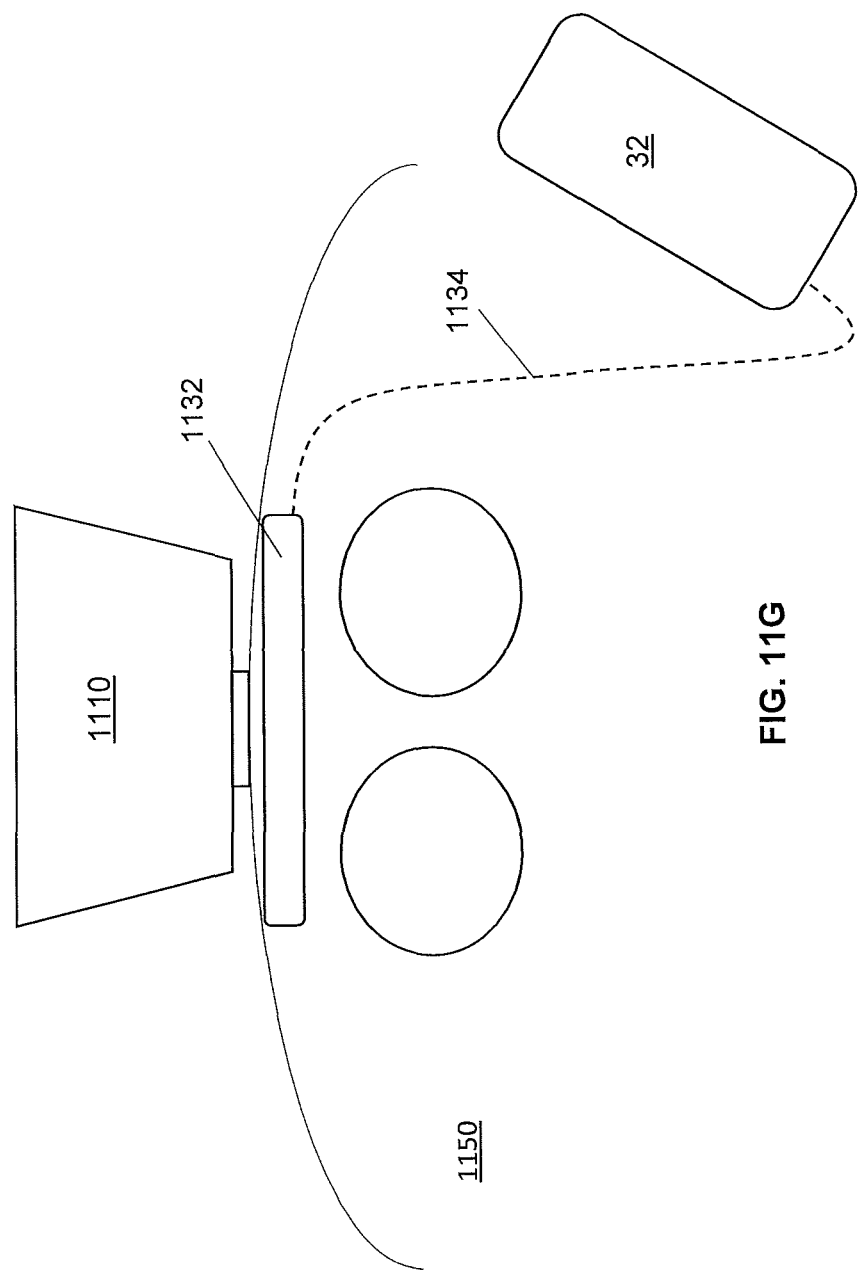
FIG. 11G is a dashboard view of another embodiment of the built-in heads up display system using mirror linking, in accordance with aspects of the inventive concept.

FIG. 11G is a dashboard view of another embodiment of the built-in heads up display system using minor linking, in accordance with aspects of the inventive concept. In this embodiment, a display 1132 is built-in to a portion of the dashboard 1150 and oriented to transmit its output upward toward the display medium 1110 of the heads up display. The smartphone 32 is not docked into the dashboard or surrounding area, as in FIGS. 11A-11E. Rather, the smartphone 32 can be connected to the display 1132 by a wired or wireless connection, collectively depicted as dashed line 1134 in FIG. 11F. In this embodiment, display 1132 "mirrors" (or otherwise replicates or regenerates) the graphical output of the display of the smartphone 32. The heads up display, therefore, can include a dedicated display 1132 having a communication capability with the smartphone 32.

Figure 12A:
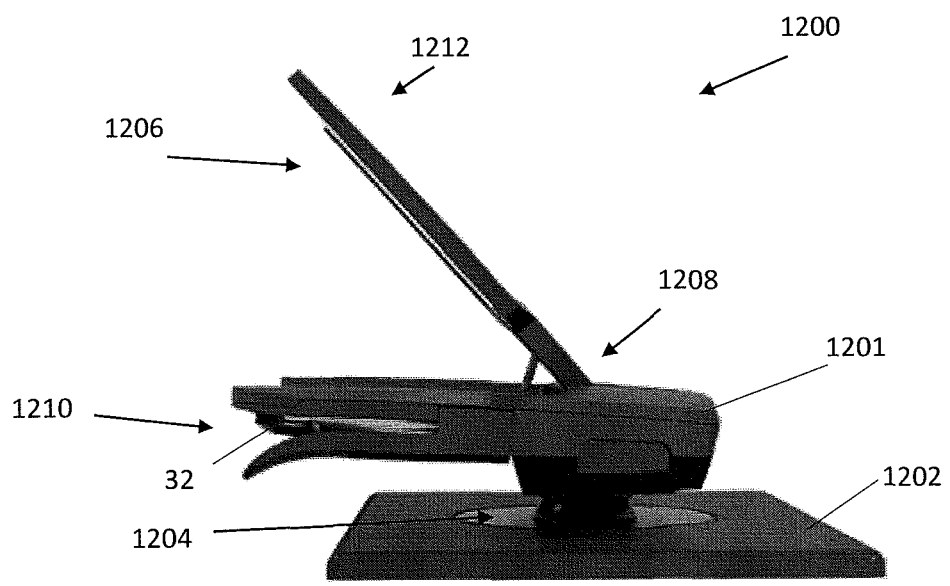
FIG. 12A is a side view of an embodiment of a dashboard mountable heads up display system, in accordance with aspects of the inventive concept.
Figure 12B:
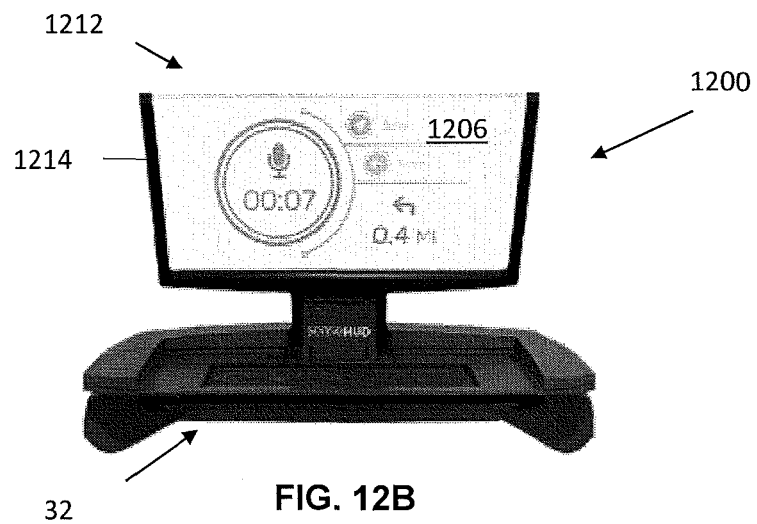
FIG. 12B is a front view of an embodiment of a dashboard mountable heads up display system of FIG. 12A.
Figure 12C:
FIG. 12C is a perspective view of the dashboard mountable heads up display system of FIG. 12A.

FIG. 12A is a side view of an embodiment of a dashboard mountable heads up display system, in accordance with aspects of the inventive concept. FIG. 12B is a front view of an embodiment of a dashboard mountable heads up display system of FIG. 12A. FIG. 12C is a perspective view of the dashboard mountable heads up display system of FIG. 12A. In the views of FIGS. 12A, 12B, and 12C shown is an exemplary embodiment of a vehicular heads-up-display, in which a support is included that allows for placement of the heads up display system on or within a vehicle dash-top or other surface.

The side view of FIG. 12A illustrates an exemplary embodiment of a heads up display system 1200 in accordance with principles of inventive concept, in which a housing (or HUD base) 1201 is mounted on a support 1202 through a swivel mount 1204, which may be a ball-mount that provides orientation-adjustment of housing 1201 through a limited range of motion in 360 horizontal degrees, for example. A display 1212 includes a display medium 1206, e.g., a partially reflective minor, is affixed to housing

1201 through hinged joint 1208. The housing can include electronics necessary for driving the display medium and communicating with the portable device and/or the vehicle and/or other systems.

A device receptacle 1210 is configured to receive, position, and retain a portable electronic device 32 for use by a vehicle operator. Display outputs from electronic device 32 may be projected upward to be displayed on display medium 1206 for use by a vehicle operator. In exemplary embodiments, the electronic device 32 may be operated "hands-free" through voice commands, for example, thereby avoiding the need for a tactile user interface.

Support 1202 may be affixed to the top of a vehicle's dashboard (or within a depression therein) using permanent (screws, adhesives, etc.) or temporary (hook and loop, semi-permanent adhesive, Velcro, clips, etc.) devices.

The front plan view of FIG. 12B illustrates the system of FIG. 12A from the front, with the display medium 1206 (e.g., a partially reflective mirror) deployed (upright) for use, with information from a portable electronic device 32 displayed for viewing by a vehicle operator. The display 1212 can include a frame 1214, as discussed above, to support and/or protect the display medium 1206.

The perspective view of FIG. 12C illustrates the system of FIGS. 12A and 12B, with the partially reflective mirror 1206 in a fully stored (horizontal) or closed position. In this position, a vehicle operator has an open line-of-sight to the road in front of him.

Figure 13A:
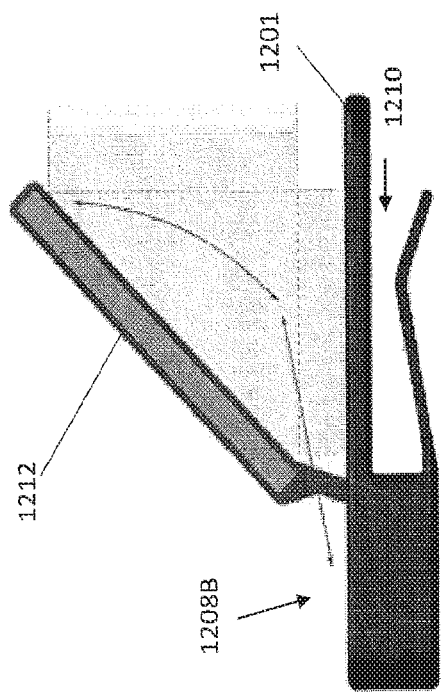
FIG. 13A is a side view of an embodiment of a dashboard mountable heads up display system having a non-translatable hinge for the display medium, in accordance with aspects of the inventive concept.

FIG. 13A is a side view of an embodiment of a dashboard mountable heads up display system having a non-translatable hinge for the display medium, in accordance with aspects of the inventive concept. FIG. 13A is a side view of an embodiment of a dashboard mountable heads up display system having a translatable hinge for the display medium, in accordance with aspects of the inventive concept.

Figure 13B:
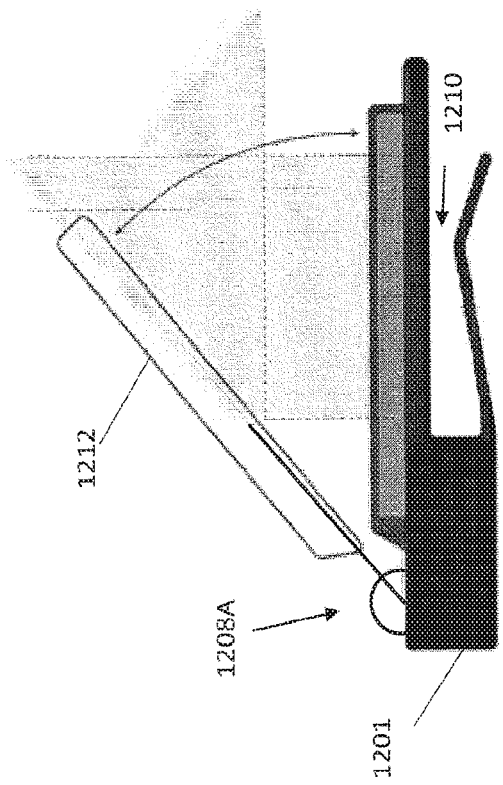
FIG. 13B is a side view of an embodiment of a dashboard mountable heads up display system having a translatable hinge for the display medium, in accordance with aspects of the inventive concept.

In the exemplary embodiments of FIGS. 13A and 13B, the heads up display is similar to that shown in FIGS. 12A-C, without particular regard to the support 1202. The heads up display includes a housing 1201 and a display 1212 having a display medium, such as a partially reflecting mirror. The display 1212 is attached to the housing 1201 through fixed 1208A in FIG. 13A and through a gliding hinges 1208B in FIG. 13B. The gliding hinge embodiment of FIG. 13B allows the display 1212 to translate forward as it is deployed and opened for use, allowing the full screen to be viewable by an operator in situations where a fixed hinge, such as that of FIG. 13A, might not provide that level of viewability.

Figure 14:
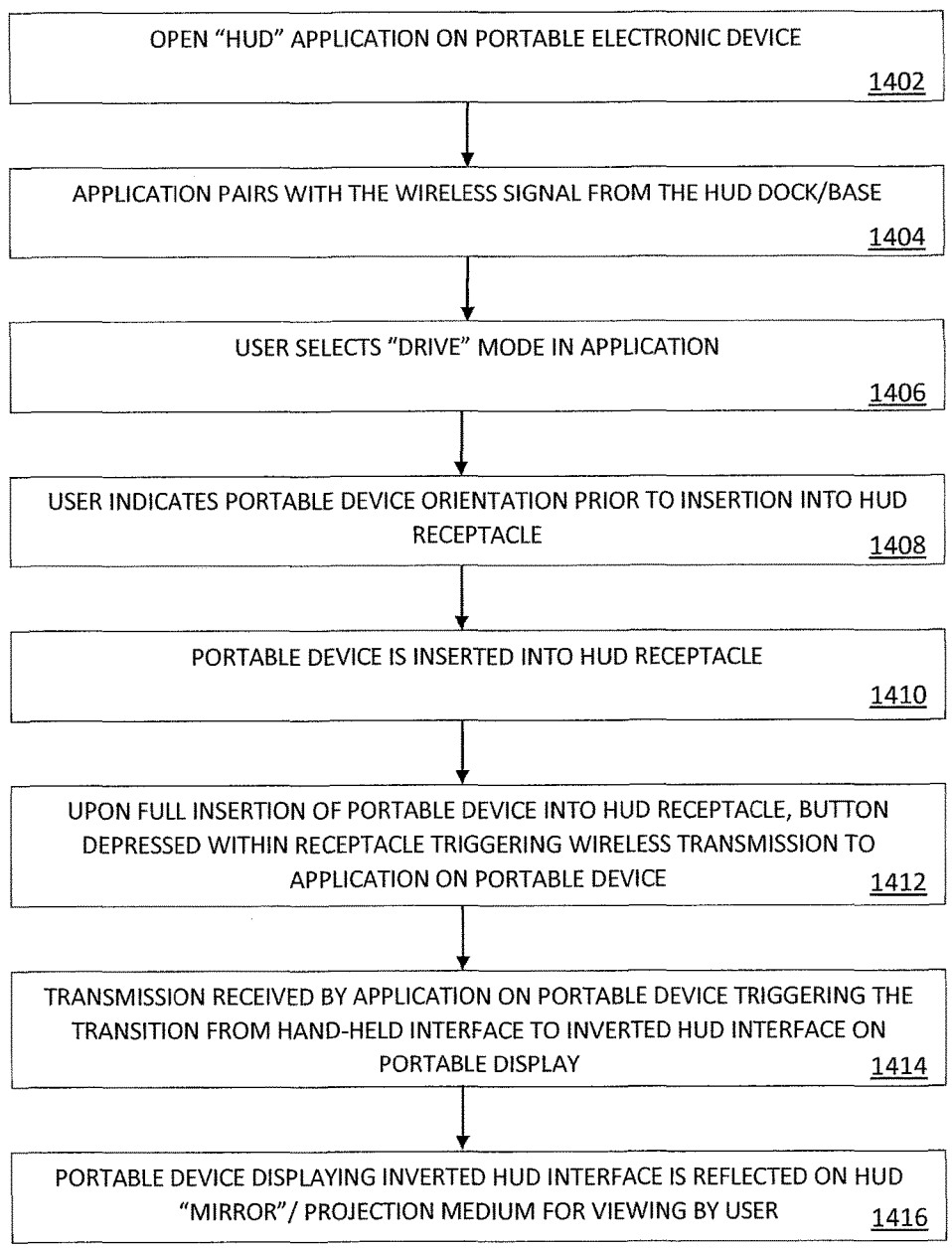
FIG. 14 is a flowchart of an exemplary embodiment of use of a vehicular heads up display, in accordance with aspects of the inventive concept.

FIG. 14 is a flowchart of an exemplary embodiment of a method of use of a vehicular heads up display, in accordance with aspects of the inventive concept. The flowchart of FIG. 14 illustrates an exemplary process 1400 of operating a vehicular heads up display in accordance with principles of inventive concepts.

In step 1402, a heads up display (HUD) application is opened on a portable electronic device, such as device 32. The HUD application pairs with a wireless signal from a HUD base, such as base 1201, in step 1404. Initialization information may be exchanged between the HUD base and portable electronic device at this point. In step 1406 a user selects a "drive" mode, allowing him to interact with the HUD, HUD base, and portable electronic device while driving. In exemplary embodiments a user may indicate in step 1408 to the HUD application which one of a plurality of allowed orientations the portable electronic device will be inserted into the HUD base/receptacle. Such orientations may reflect the automatic re-orientation of a smartphone, for example. The device may then be mated with the HUD base in step 1410 and then wireless transmission between the base and application on the electronic device may be enabled in step 1412 but user interaction, such as activation of a pushbutton, for example. In step 1414 a transmission received by the application on the portable device triggers a transition from the handheld interface to an inverted HUD interface on the portable device's display. From there the process proceeds to step 1416, where the inverted display is reflected on the HUD partially reflective mirror for viewing by the user.

In various embodiments, voice interaction with the heads up display system can be used. In such a case, a voice command (e.g., "OK SenseSay") can be used to "trigger" the HUD system, to initiate a session. In some embodiments, after the triggering command, a set of predetermined commands could be made available for vice activation, e.g., Navigate, Play Music, Call Home, and so on. Such predetermined commands could be arranged in a hierarchy, e.g., with top level commands and then lower level commands, e.g., Navigate, then Go Home. In some embodiments, the HUD system could be responsive to natural language commands, following the triggering command. In such cases, the HUD system includes functionality to determine meaning from natural speech. In some embodiments, the HUD system can include functionality to selectively switch between predetermined hierarchical commands and natural language commands.

In exemplary embodiments in accordance with principles of inventive concepts, a vehicular heads-up-display may employ a display comprising a switchable mirror (also referred to herein as a tunable mirror or electrically switchable transreflective mirror) in the glass combiner 33, as illustrated in FIG. 1. Switchable mirrors are known and described, for example, in U.S. Pat. No. 7,009,666 issued to Khan et al and assigned to Kent Displays Incorporated.

Figure 15:
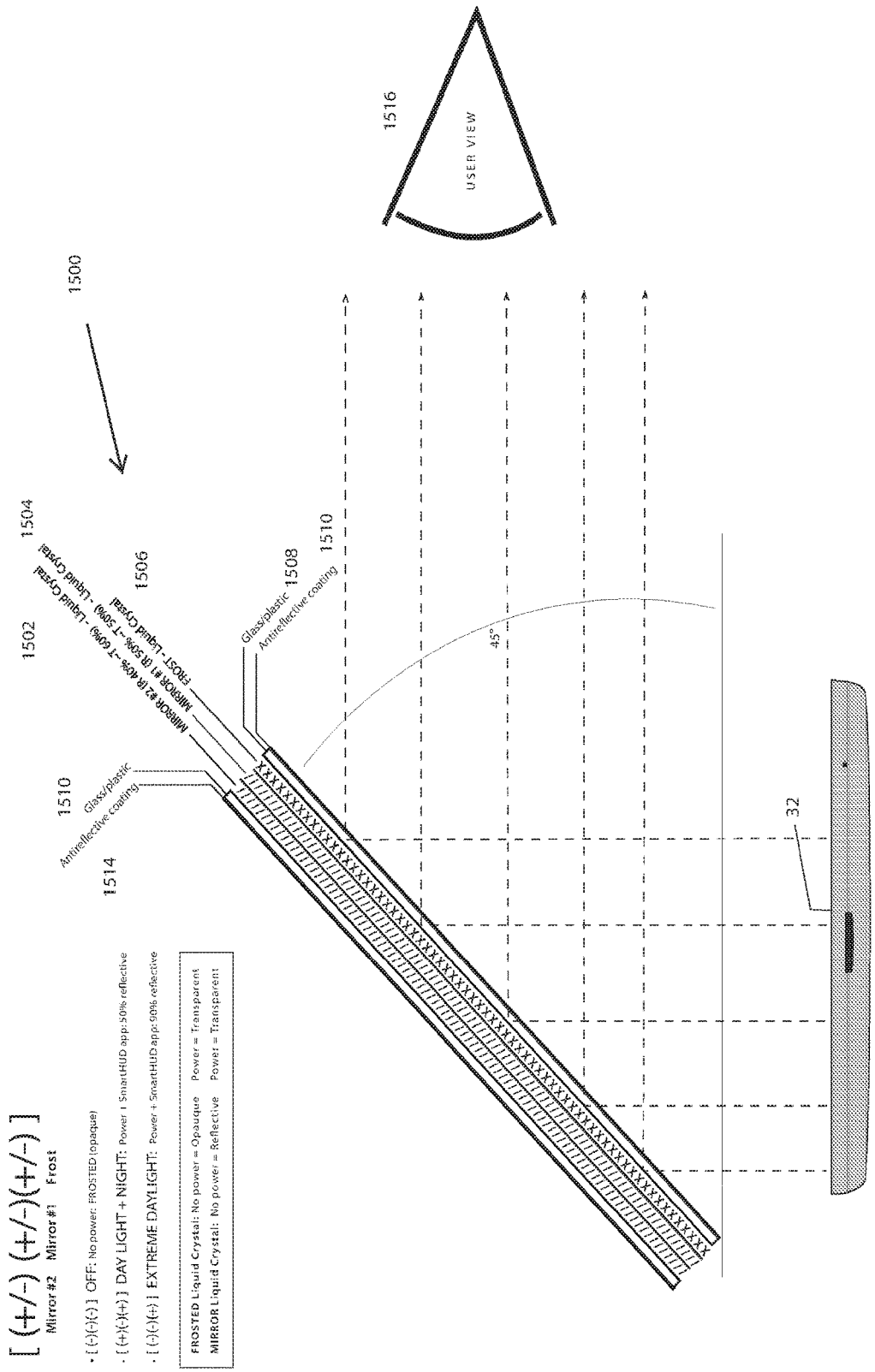
FIG. 15 is a diagram of an embodiment of an electrically switchable transreflective mirror useful in a heads up display system, in accordance with aspects of the inventive concept.

In the exemplary embodiment of FIG. 15, switchable mirror 1500 includes liquid crystal layers 1502, 1504, and 1506. Liquid crystal layers 1502 and 1504 are second and first mirror layers, respectively. In exemplary embodiments in accordance with principles of inventive concepts, mirror layer 1504 may have a reflectance of 50% (and transmissivity of 50%), and mirror layer 1502 may have a reflectance of 40% (and transmissivity of 60%). Layer 1506 is a "frost" layer that, under electronic control, may switch from translucent to highly reflective. Protective layers 1508, 1510 seal the liquid crystal layers, and may include glass or plastic, for example. Anti-reflective coatings 1512, 1514 are formed over protective layers 1508 and 1510, respectively. In this exemplary embodiment, switchable mirror 15000 is inclined at (or about) 45° to the plane of smartphone 32, with the viewer 1016 positioned at about 90° to the plane of the smartphone 32.

In accordance with principles of inventive concepts, the degree of reflectance of switchable mirror 1500 may be electronically controlled to adjust to ambient lighting conditions or other factors. Control of the reflectance may be manual or automatic. In exemplary embodiments in accordance with principles of inventive concepts a light sensor may be employed to determine ambient light levels and to automatically adjust the reflectivity of the switchable mirror 1500 accordingly. A portable electronic device, such as a smartphone camera, may be employed as a light sensor for light-level sensing, for example. A heads up display in accordance with principles of inventive concepts may include a wireless interface and a link between the smartphone and switchable mirror 1500 may be implemented using a wireless link employing Bluetooth technology, for example, in order to adjust the reflectance of the switchable mirror according to light levels detected by the smartphone camera.

In exemplary embodiments in accordance with principles of inventive concepts, switchable mirror 1500 may be controlled in a manner that allows for greater interaction, for example, when a vehicle in which it is employed is not in motion. When the vehicle is at rest the switchable mirror 1500 may be tuned to a high degree of reflectivity (in the range of 60% to 90%, for example), allowing for more detailed graphics to be displayed to the user. Control of reflectivity may be automatic, with the system sensing motion (or lack thereof) or manual, with a user directly controlling the reflectivity of the switchable mirror 1500. In accordance with principles of inventive concepts, a system in accordance with principles of inventive concepts may prevent, or "lock out," use of high reflectivity while the vehicle is in motion. When the switchable mirror is in a high reflectance mode of operation, though, a system in accordance with principles of inventive concepts may present more detailed information, enabling the use of a greater range of applications. For example, an Internet browser may be displayed, allowing a user to search the Internet and interact with the browser through voice commands, for example. As with other applications, a system in accordance with principles of inventive concepts alters images displayed by the smartphone (for example, by inverting) to accommodate projection onto switchable mirror 1500. When in an Internet mode of operation, the browser may be configured to land on a search engine of the user's choice, for example.

Figure 16:
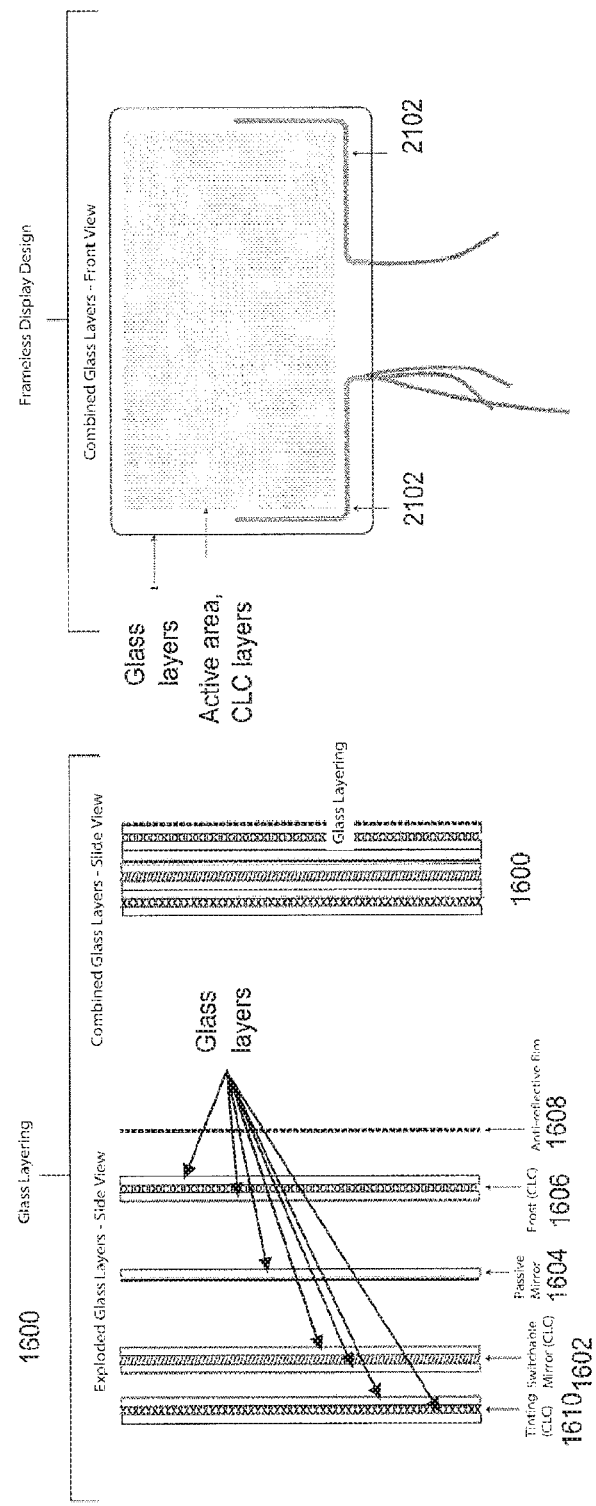
FIG. 16 is a side view of embodiment of an image projection medium in an exploded view and in an assembled view, in accordance with aspects of the inventive concept.

FIG. 16 shows another embodiment of a display medium 1600 that can form part of a heads up display system, in accordance with aspects of the inventive concept. In this embodiment, the display medium is shown in an exploded view and in an assembled view. The view can be considered a cross-section or side view of the image projection medium. As a projection medium, the display medium can project the display contents beyond the glass thereof.

In this embodiment, the display medium 1600 comprises a plurality of layers. A switchable mirror (cholesteric liquid crystal—CLC) 1602 is combined with a passive mirror 1604, here they are directly coupled such as with glue. A frost layer (CLC) 1606 is combined with the passive mirror 1604, opposite the switchable mirror. And an anti-reflective layer 1608 is added to the frost layer, which further prevents shadowing as well as glare. To the opposite side of the switchable mirror, is a tinting (CLC) layer 1610. In the preferred form, the user would view the image through the side of the display medium having the anti-reflective layer. The CLC layers are active layers.

Figure 17:
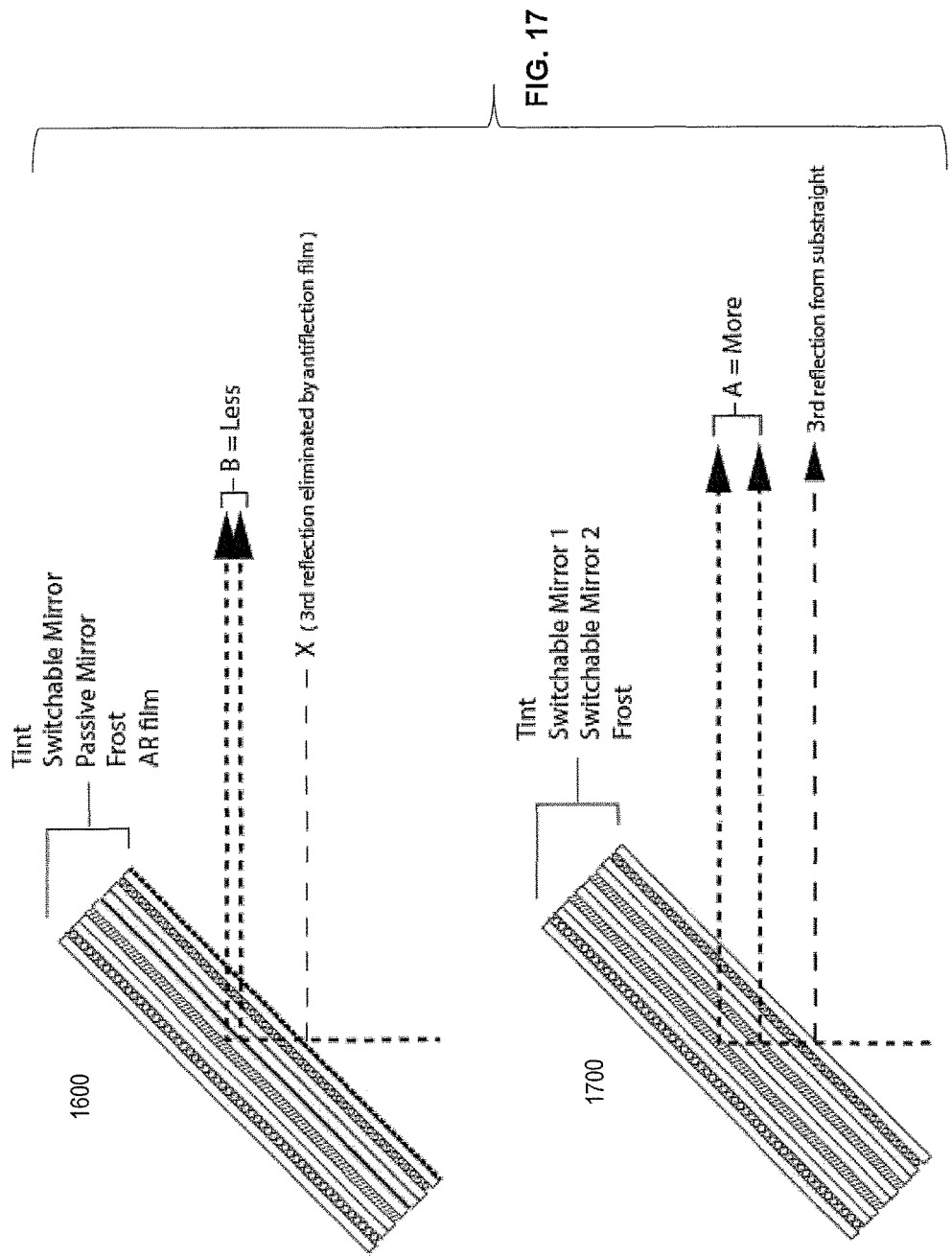
FIG. 17 shows a comparison of the image projection medium of FIG. 16 compared to the switchable minor of 15, which includes two switchable mirrors.

FIG. 17 shows a comparison of the display medium 1600 of FIG. 16 compared to a display medium 1700 having two switchable mirrors sandwiched between a tint layer and frost layer. FIG. 17 illustrates improvements in double "ghosting" reflection achieved by the display medium of FIG. 16 when compared to the double switchable mirror 1700. Note, the AR film in the design of FIG. 16 also acts as a safety glass keeping fractures together if broken on impact.

In the display medium 1600 of FIG. 16, a passive mirror is chosen instead of a second switchable mirror (see FIG. 17) because a second switchable mirror tends to lead to shadowing or double images in the virtual image displayed. That is, the multiple layers of a second switchable mirror in combination with the first switchable mirror can lead to such undesirable effects. Use of a passive mirror in combination with the switchable mirror produces an improved virtual image.

Figure 18:
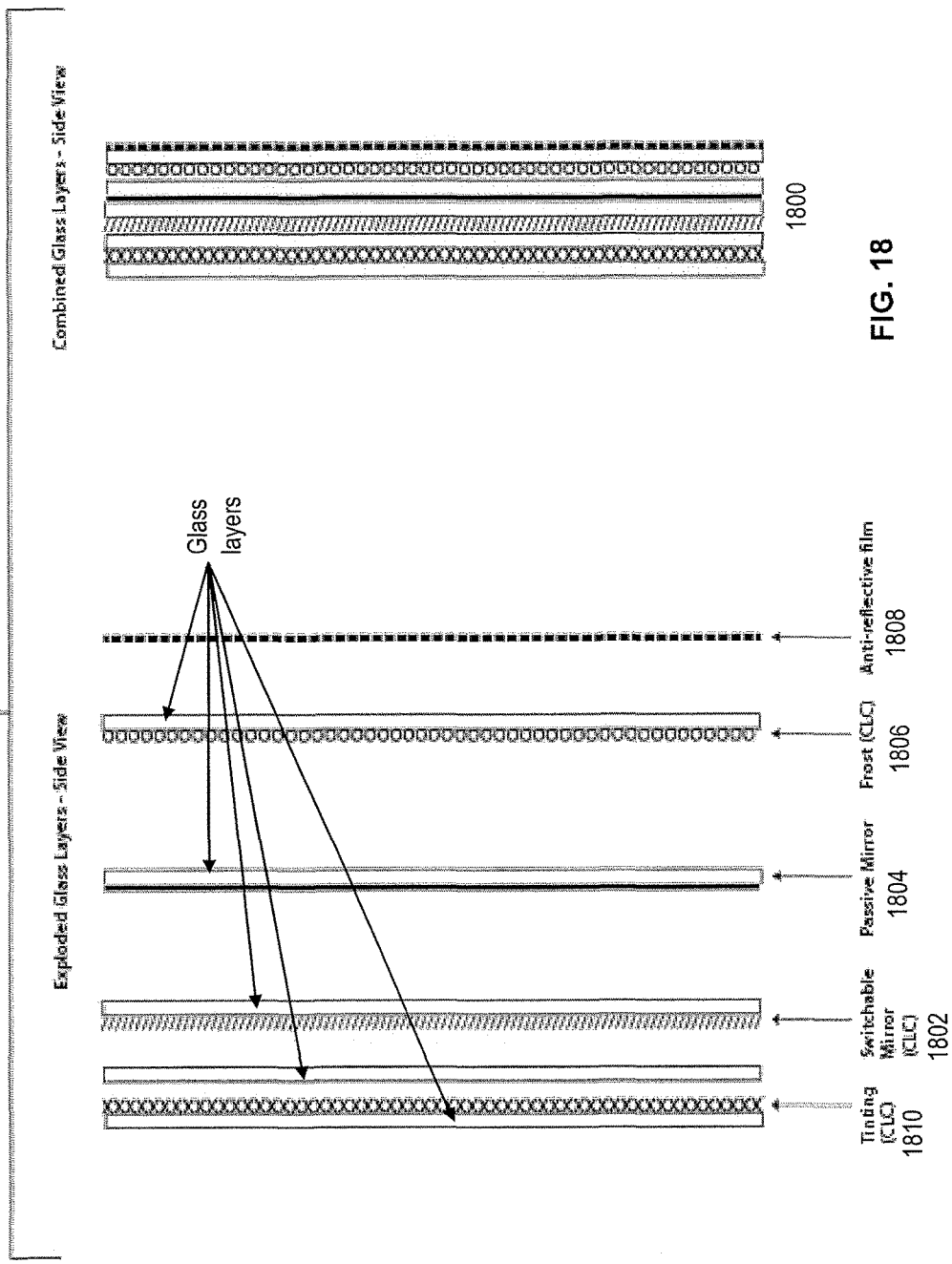
FIG. 18 shows another embodiment of an image projection medium, in accordance with aspects of the inventive concept.

FIG. 18 shows another embodiment of a display medium 1800, according to aspects of the inventive concept. In this embodiment, the display medium 1800 comprises a plurality of layers. A switchable mirror (cholesteric liquid crystal—CLC) 1802 is combined with a passive mirror 1804, here they are directly coupled such as with glue. A frost layer (CLC) 1806 is combined with the passive mirror 1804, opposite the switchable mirror. And an anti-reflective (AR) layer 1808 is added to the frost layer, which further prevents shadowing as well as glare. To the opposite side of the switchable mirror, is a tinting (CLC) layer 1810. In the preferred faun, the user would view the image through the side of the display medium having the anti-reflective layer. The CLC layers are active layers.

This embodiment differs from that of FIG. 16 in that some layers of glass are omitted. That is, as compared to FIG. 16, one of the glass sides for each CLC mirror layer has been eliminated, thus reducing the mirror's overall width and thereby reducing the ghosting distortion. Therefore, in this embodiment, a single layer of glass is used between two CLC layers—rather than two glass layers. This embodiments, therefore, reduces the number of glass substrates needed from 7 (FIG. 16) down to 5 (FIG. 18), thus further reducing cost, weight, and thickness.

Figure 19:
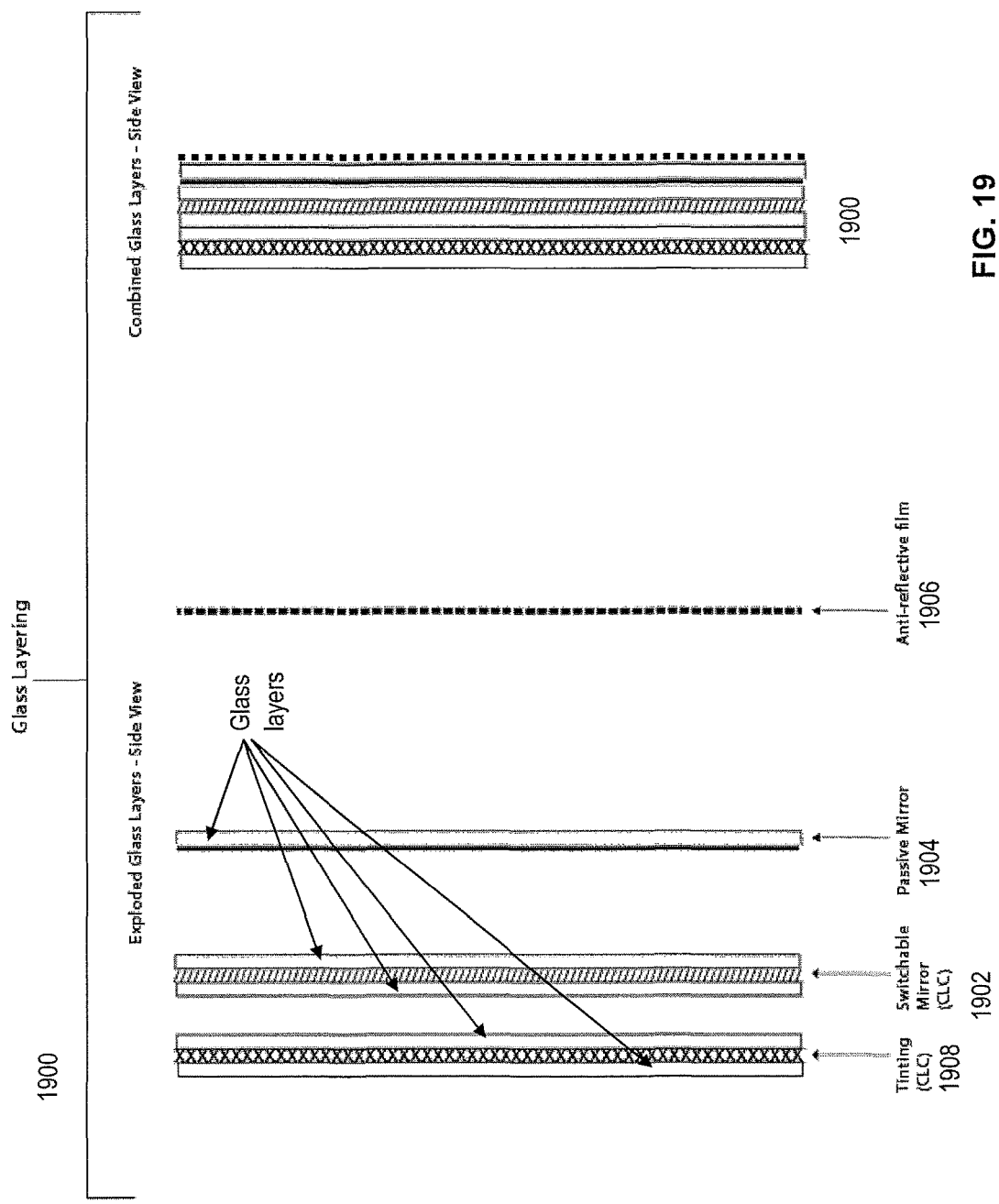
FIG. 19 shows a combination of the image projection medium (with switchable mirror), Fresnel lens, and smartphone, in accordance with aspects of the inventive concept.

FIG. 19 shows another embodiment of a display medium 1900 that can folio part of a heads up display system, in accordance with aspects of the inventive concept. In this embodiment, the display medium is shown in an exploded view and in an assembled view. The view can be considered a cross-section or side view of the image projection medium.

In this embodiment, the display medium 1900 comprises a plurality of layers. A switchable mirror (cholesteric liquid crystal—CLC) 1902 is combined with a passive mirror 1904, here they are directly coupled such as with glue. And an anti-reflective layer 1906 is added to the passive mirror 1904, which further prevents shadowing as well as glare. To the opposite side of the switchable mirror, is a tinting (CLC) layer 1908. In the preferred form, the user would view the image through the side of the display medium having the anti-reflective layer. The CLC layers are active layers. This embodiment further reduces the number of glass layers of the display medium 1900 to five glass layers.

Figure 20:
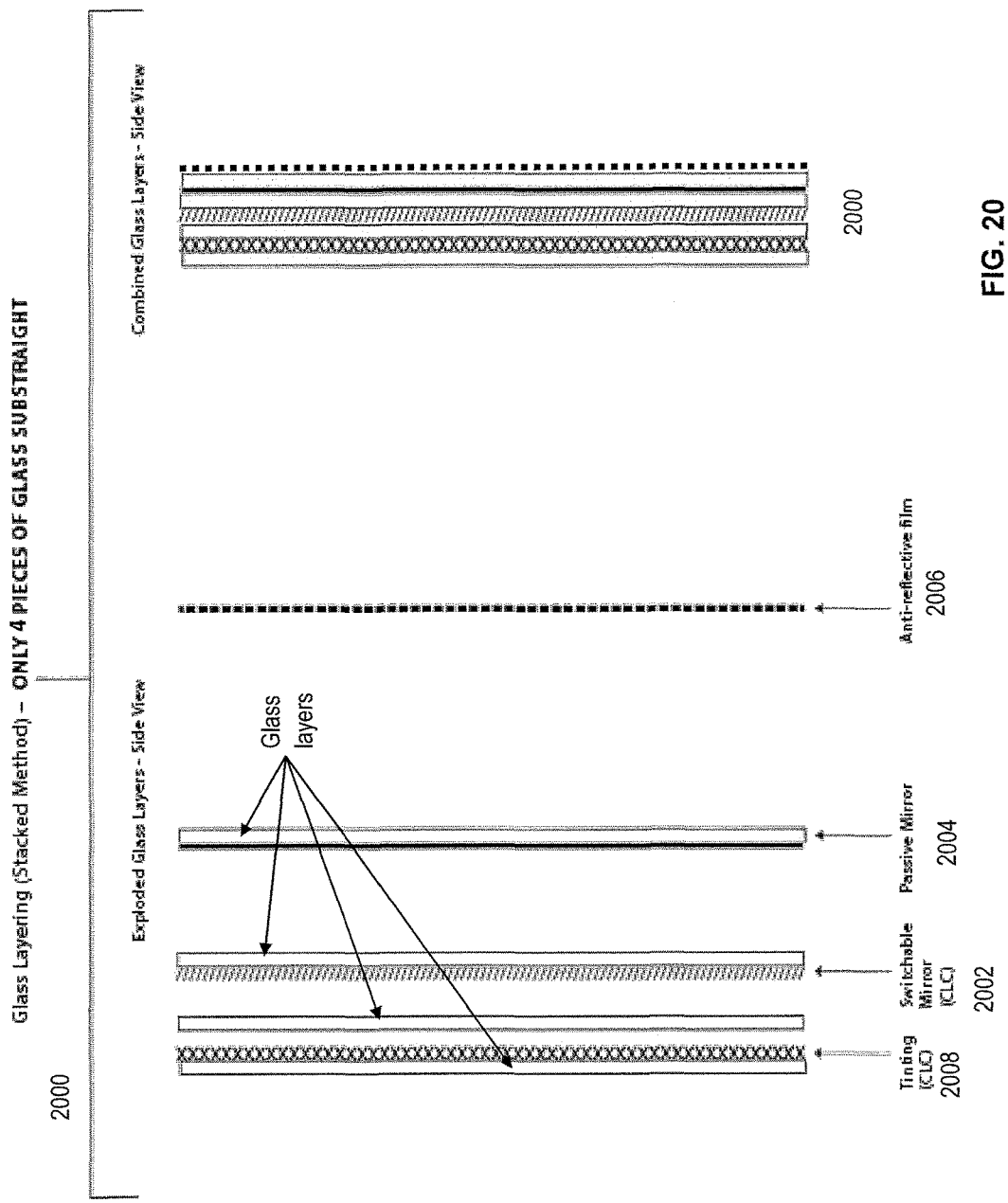
FIG. 20 shows a front view, from a user's perspective, of the image projection medium of FIG. 15, 16, 17, 18, 19 or 20, in accordance with aspects of the inventive concept.

FIG. 20 shows another embodiment of a display medium 2000 that can form part of a heads up display system, in accordance with aspects of the inventive concept. In this embodiment, the display medium is shown an exploded view and in an assembled view. The view can be considered a cross-section or side view of the image projection medium.

In this embodiment, the image projection medium 2000 comprises a plurality of layers. A switchable mirror (cholesteric liquid crystal—CLC) 2002 is combined with a passive mirror 2004, here they are directly coupled such as with glue. And an anti-reflective layer 1906 is added to the passive mirror 1904, which further prevents shadowing as well as glare. To the opposite side of the switchable mirror, is a tinting (CLC) layer 2008. In the preferred four, the user would view the image through the side of the image projection medium having the anti-reflective layer. The CLC layers are active layers. This embodiment further reduces the number of glass layers of the display medium 2000 to four glass layers.

FIG. 21 shows a front view, from a user's perspective, of the display medium of FIG. 16, 18, 19, or 20. A conductive lead 2102 is provided for each active layer, but a single common ground lead 2104 may be provided in some embodiments. The glass and active layers may be combined such that a frame may not be needed, but may optionally be used as shown in other embodiments. The display medium, therefore, may be any of display mediums 1500, 1600, 1700, 1800, 1900, 2000, or similar glass and active layer combinations suitable as a display medium within the context of the invention.

Figure 22:
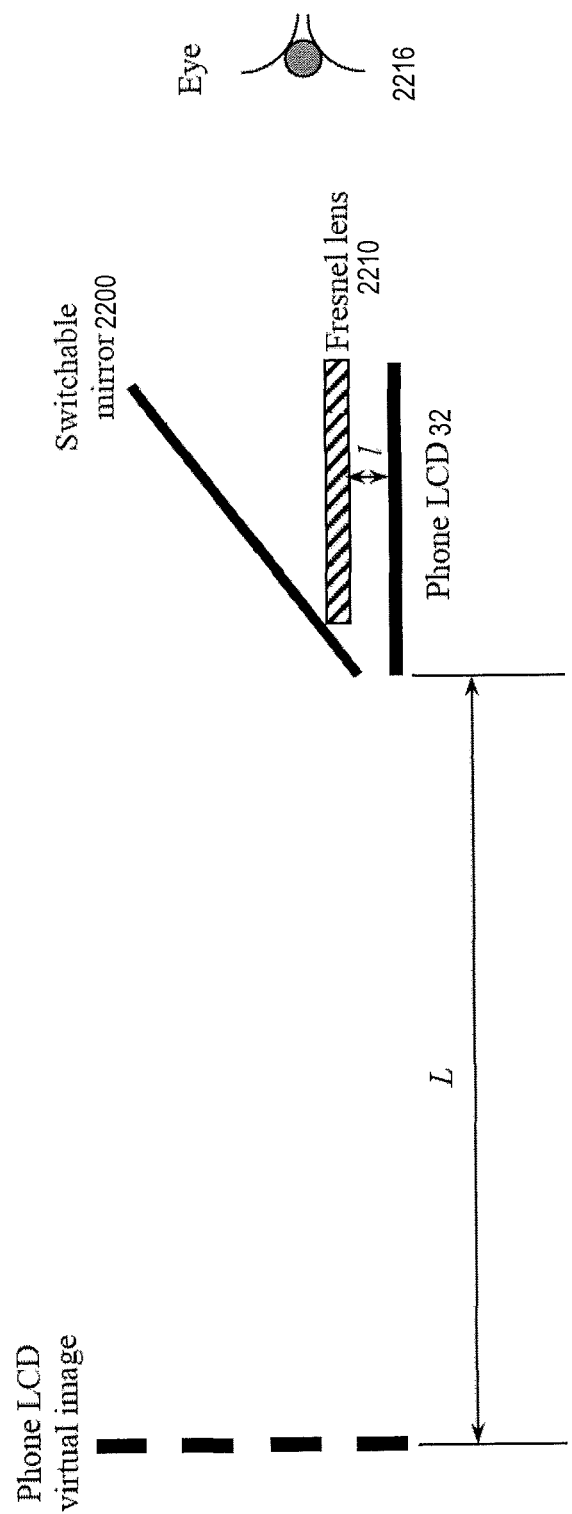
FIG. 22 shows yet another embodiment of an image projection medium, in accordance with aspects of the inventive concept.

FIG. 22 shows a combination of the display medium (with switchable mirror) 1500, 1600, 1700, 1800, 1900, 2000 (collectively, 2200) and Fresnel lens 1910 in combination to project the image form a smartphone mounted, docked or connected to the heads up display. That is, any of the display medium embodiments discussed above could be used as the display medium 2200 in various embodiments. The combination of Fresnel lens (or other collimator) with the display medium (e.g., switchable mirror) enables image projection, as discussed below.

In this embodiment, the smartphone display has a substantially horizontal orientation with the display facing upward. The display medium 2200 is angled above and over the phone display, e.g., between 45 and 90 degrees from horizontal. The Fresnel lens 2210 is disposed substantially horizontal and above the display of the smartphone 32, at a distance l above the phone display. In exemplary embodiments, the distance l may be less than or about 1 (one) inch to keep the overall device at a minimum height.

The configuration shown in FIG. 22 projects a virtual image of the output of the phone display at a distance L in a forward direction, which is opposite from the viewer 2216. In an exemplary embodiment, the distance L is chosen so that a virtual image is projected at about 5 feet in front of the vehicle, when the system is used as a vehicle heads-up-display (HUD). However, the projection distance L is not limited to such a distance; L could be more or less than 5 feet.

Key features of the disclosed image projection medium include, but are not limited to:

1. Reduction of Distortion (Also Called "Ghosting" or "Doubling")

Disclosed iteration remove one of the prior two switchable CLC mirror layers from the medium described in FIG. 15 and replaces it with a passive mirror layer. The passive mirror is narrower in its width than a switchable CLC mirror. By reducing the width of the overall mirror (see FIGS. 16-20), reduces ghosting. By eliminating a switchable CLC mirror layer, there is less space between reflective layers, thereby decreasing the ghosting or doubling effect of the reflected image viewed by a user.

Replacing the second switchable mirror with a passive mirror layer has the added bonus of brightening the reflected image seen by user, because the CLC itself has an inherently darker nature, probably due to the composition of the LC. Also, when the tintable CLC is in transparent mode, use of a passive mirror instead of two CLC mirrors results in a more clear and less dark image especially while driving at night.

2. Adding Plastic AR Film Increases Acuity and Safety

A plastic anti-reflective (AR) film has been added that will reduce glare to the viewer and help keep the mirror from fragmenting within the car should the mirror break.

3. Miscellaneous Features that may be Realized

Features include:
More durable glass
Rounded edges
Sealed glass edges
Elimination of plastic framing around vertical edges of the mirror
Key shaped screen
Wire leads sandwiched in glass to minimize area taken up in glass to preserve viewing area for driver sight safety 4. Addition of Fresnel Lens to Project Image in Front of Windshield A Fresnel lens has been added to the base of the mirror to make the image appear to be projected in front of the user's car windshield, increasing ease of use and safety by keeping the image in the driver's line of sight.

Thus, in accordance with aspects of the present inventive concept, provided is an image projection medium that greatly improves image quality, glass clarity, helps reduce cost, and can eliminate the need for a frame and make it safety glass.

Also in accordance with aspects of the present inventive concept, provided is a virtual image system comprising the image projection medium and a Fresnel lens, e.g., a collimated Fresnel lens, which can be configured to produce a high quality virtual image. For example, the Fresnel lens can be used to project a display output from a mobile device onto the image projection medium. The image projection medium can be arranged to direct or project the high quality virtual image in a predetermined direction and at a predetermined distance.

A support can be configured to hold and maintain the image projection medium and Fresnel lens and mobile device in a desired orientation to effectively act as a projection system that can produce a virtual image of a display output of a mobile (or portable) device. The support, image projection medium, and Fresnel lens can collectively form a heads-up display (HUD) system configured to receive a portable device, e.g., a smartphone.

In various embodiments, the HUD system can be configured for use in a vehicle, such as an automobile, truck, heavy equipment, farm implement, forestry harvester, or other vehicle, as described above. Images provided by the HUD system can be collimated and, as a result, the images appear to be projected out in front of the display, and an operator's eyes do not need to refocus between viewing the display and the outside world. Using the Fresnel lens collimated images may appear to be projected at various distances in front of the vehicle, e.g., in a range of from one to twenty feet in front of the windshield.

In various embodiments, the mobile device, Fresnel lens, and image projection medium can be arranged to project the display output from the mobile device as a virtual image in a forward direction and at a predetermined distance.

In various embodiments, the Fresnel lens and image projection medium can be integral with a forward portion of a vehicle cabin and configured to receive and maintain a mobile device, to enable use and viewing thereof by the vehicle's operator via the heads up display system. In some embodiments, the Fresnel lens and image projection medium can be mounted to a dashboard or windshield of a vehicle via the support.

In various embodiments, the support can be configured to hold and maintain the mobile device (e.g., smartphone). In such embodiments, the virtual image system can be used in combination with a mobile device to project the image thereof.

In various embodiments, the support can be configured to make the orientation of one or more of the image projection medium, Fresnel lens, and mobile device user adjustable.

In various embodiments, the Fresnel lens and image projection medium can be arranged to project the virtual image at a distance in a range of about 3-15 feet in the forward direction, e.g., in front of the vehicle.

In various embodiments, the Fresnel lens and image projection medium can be arranged to project the virtual image at a distance in a range of about 1-10 feet in the forward direction, e.g., in front of the vehicle.

In various embodiments, the Fresnel lens and image projection medium can be arranged to project the virtual image at a distance in a range of about 3-7 feet in the forward direction, e.g., in front of the vehicle.

In various embodiments, the Fresnel lens and image projection medium can be arranged to project the virtual image at a distance at about 5 feet in the forward direction, e.g., in front of the vehicle.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A heads-up-display (HUD) system, comprising:
   a display medium;
   a collimator aligned with the display medium;
   a dock configured to accept a portable electronic device having a display and to align the portable electronic device display with the display medium and collimator; and a set of control and communications electronics configured to control the display medium and communicate with the portable electronic device,
   wherein the display medium is a partially reflective mirror that comprises an electrically switchable mirror, and
   wherein the display medium and collimator are configured to cooperatively project an output of the portable electronic device display to a location off of the display medium to form a projected display.

2. The HUD system of claim 1, further comprising:
   an input device that includes a wireless interface for communication with a controller configured to control the electrically switchable mirror.

3. The HUD system of claim 1, wherein the projected display is configured to be responsive to voice commands.

4. The HUD system of claim 3, wherein the voice commands include a triggering command configured to initiate communication between the portable electronic device and the HUD system.

5. The HUD system of claim 3, wherein the HUD system is responsive to a set of predetermined voice commands.

6. The HUD system of claim 5, wherein the predetermined voice commands include natural language commands.

7. The HUD system of claim 3, wherein the dock is integral with a top portion or surface of a gauge visor of a vehicle dashboard.

8. The HUD system of claim 3, wherein the dock is integral with a bottom portion or surface of a gauge visor of a vehicle dashboard.

9. The HUD system of claim 1, wherein the HUD system is disposed in a vehicle and the HUD system is configured to control the electrically switchable mirror to be highly reflective when the vehicle is not traveling.

10. The HUD system of claim 1, wherein the HUD system is disposed in a vehicle and the HUD system is configured to provide web browsing when the vehicle is not traveling.

11. The HUD system of claim 1, wherein the HUD system is configured to collect and store data.

12. The HUD system of claim 1, wherein the HUD system is disposed in a vehicle and the HUD system is configured to store and/or display data including vehicle speed, vehicle location, navigation information, and/or music information.

13. The HUD system of claim 1, wherein the HUD system is configured to upload data to at least one remote storage device or system.

14. The HUD system of claim 1, wherein the dock is integral with a gauge visor of a vehicle dashboard.

15. The HUD system of claim 14, wherein the vehicle dashboard includes an aperture between the dock and the display medium that enables transmission of the portable electronic device to the display medium.

16. A heads-up-display (HUD) system, comprising:
    a display medium;
    a collimator aligned with the display medium;
    a dedicated display aligned with the display medium and collimator;
    a communication device configured to communicate with a portable electronic device; and
    a set of control and communications electronics configured to control the display medium, the dedicated display, and communicate with the portable electronic device to receive at least display information from the portable electronic device,
    wherein the display medium is a partially reflective mirror that comprises an electrically switchable mirror, and
    wherein the display medium and collimator are configured to cooperatively project an output of the dedicated display that is received from the portable electronic device display to a location off of the display medium to form a projected display.

17. The HUD system of claim 16, wherein the communication between the portable electronic device and the set of control and communication electronics and the HUD system includes wireless communications.

18. The HUD system of claim 16, wherein the communication between the portable electronic device and the set of control and communication electronics and the HUD system includes wired communications.

19. The HUD system of claim 16, further comprising a display frame that at least partially covers edges of the display medium,
    wherein the display frame prevents warping, distortion, and/or damage to the display medium.

20. The HUD system of claim 16, wherein the projected display is configured to be responsive to voice command.

* * * * *